(12) United States Patent
Takeguchi et al.

(10) Patent No.: US 8,980,500 B2
(45) Date of Patent: Mar. 17, 2015

(54) POLYMER ELECTROLYTE FUEL CELL COMPRISING REACTANT GAS CHANNELS OVERLAPPING A PERIPHERAL PORTION OF AN ELECTRODE

(75) Inventors: Shinsuke Takeguchi, Osaka (JP); Takeou Okanishi, Nara (JP); Yoichiro Tsuji, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 255 days.

(21) Appl. No.: 13/516,869

(22) PCT Filed: Feb. 2, 2011

(86) PCT No.: PCT/JP2011/000567
§ 371 (c)(1),
(2), (4) Date: Jun. 18, 2012

(87) PCT Pub. No.: WO2011/096205
PCT Pub. Date: Aug. 11, 2011

(65) Prior Publication Data
US 2012/0258380 A1    Oct. 11, 2012

(30) Foreign Application Priority Data
Feb. 5, 2010   (JP) .................................. 2010-024372

(51) Int. Cl.
*H01M 8/02*      (2006.01)
*H01M 8/04*      (2006.01)
*H01M 8/10*      (2006.01)

(52) U.S. Cl.
CPC .......... *H01M 8/0258* (2013.01); *H01M 8/1002* (2013.01); *Y02E 60/521* (2013.01)
USPC ............................ 429/514; 429/480; 429/483

(58) Field of Classification Search
USPC .......... 429/492, 413, 415, 480, 483, 532, 514
See application file for complete search history.

(56) References Cited

U.S. PATENT DOCUMENTS 6,884,536 B1 * 4/2005 Hatoh et al. ................... 429/433
2002/0064702 A1 * 5/2002 Gibb ............................... 429/34
(Continued)

FOREIGN PATENT DOCUMENTS

JP     62-103978    5/1987
JP     2003-068318  3/2003
(Continued)

OTHER PUBLICATIONS

Machine Translation of: JP 2003/068318 A, Yamazaki et al., Mar. 7, 2007.*
International Search Report issued in International Patent Application No. PCT/JP2011/000567 dated May 17, 2011.

Primary Examiner — Kenneth Douyette
(74) Attorney, Agent, or Firm — McDermott Will & Emery LLP

(57) ABSTRACT

A polymer electrolyte fuel cell of the present invention includes a membrane-electrode assembly (5) and separators (6A, 6B). A plurality of reactant gas channels are formed on a main surface of at least one of the separator (6A, 6B) and a gas diffusion layer (3A, 3B). In a case where among the plurality of reactant gas channels, a reactant gas channel overlapping the peripheral portion of the electrode (4A, 4B) twice is defined as a first reactant gas channel, and a reactant gas channel formed to overlap the peripheral portion of the electrode (4A, 4B) and formed such that the length of a portion overlapping the peripheral portion is longer than a predetermined length is defined as a second reactant gas channel, the second reactant gas channel is formed such that the flow rate of a reactant gas flowing therethrough is lower than that of the reactant gas flowing through the first reactant gas channel or the second reactant gas channel does not exist.

19 Claims, 21 Drawing Sheets

(56) References Cited

U.S. PATENT DOCUMENTS

| | | | |
|---|---|---|---|
| 2002/0132159 A1* | 9/2002 | Ohya et al. | 429/44 |
| 2004/0157103 A1* | 8/2004 | Takeguchi et al. | 429/32 |
| 2008/0233447 A1 | 9/2008 | Gemba et al. | |
| 2008/0261092 A1* | 10/2008 | Bono | 429/25 |
| 2010/0086819 A1 | 4/2010 | Gemba et al. | |

FOREIGN PATENT DOCUMENTS

| | | |
|---|---|---|
| JP | 2007-157578 | 6/2007 |
| JP | 2008-146932 | 6/2008 |

* cited by examiner

POLYMER ELECTROLYTE FUEL CELL COMPRISING REACTANT GAS CHANNELS OVERLAPPING A PERIPHERAL PORTION OF AN ELECTRODE

RELATED APPLICATIONS

This application is the U.S. National Phase under 35 §371 of International Application No. PCT/JP2011/000567, filed on Feb. 2, 2011, which in turn claims the benefit of Japanese Application No. 2010-024372, filed on Feb. 5, 2010, the disclosures of which Applications are incorporated by reference herein.

TECHNICAL FIELD

The present invention relates to the configuration of a polymer electrolyte fuel cell.

BACKGROUND ART

A polymer electrolyte fuel cell (hereinafter referred to as a "PEFC") causes an electrochemical reaction between a hydrogen-containing fuel gas and an oxygen-containing oxidizing gas, such as air, to generate electric power and heat at the same time. A unit cell (cell) of the PEFC includes a MEA (Membrane-Electrode Assembly), gaskets, and electrically conductive plate-shaped separators. The MEA is constituted by a polymer electrolyte membrane and a pair of gas diffusion electrodes (an anode and a cathode).

Generally, the PEFC is formed by stacking a plurality of cells described above, providing end plates on both ends of the stacked cells, respectively, and fastening the end plates and the cells with fastening members. Therefore, high stress (fastening pressure) is applied to the vicinity of a portion of the polymer electrolyte membrane, the portion contacting an outer periphery of a catalyst layer of the gas diffusion electrode (the portion of the polymer electrolyte membrane is hereinafter referred to as an "outer peripheral contact portion of the polymer electrolyte membrane), the high stress being higher than stress applied to the other portion. By repeating start-up and stop operations of the PEFC, tensile stress and compressive stress are repeatedly applied to the polymer electrolyte membrane. Especially, these stresses are strongly applied to the outer peripheral contact portion of the polymer electrolyte membrane, and the problem is that damages, such as distortions or cracks, of the outer peripheral contact portion tend to occur.

To solve such a problem, a cell of a polymer electrolyte fuel cell is known, in which a reinforcing member is provided over the inside and outside of the peripheral edge of an oxygen electrode catalyst layer or a fuel electrode catalyst layer (see PTL 1, for example). FIG. 21 is a schematic diagram showing the schematic configuration of the cell of the polymer electrolyte fuel cell disclosed in PTL 1. In FIG. 21, a part of the polymer electrolyte fuel cell is omitted.

As shown in FIG. 21, in a cell 200 of the polymer electrolyte fuel cell disclosed in PTL 1, an elastically deformable reinforcing member 204 is provided over the inside and outside of the peripheral edge of an oxygen electrode catalyst layer 202C so as to be located on one side of the oxygen electrode catalyst layer 202C, the side being opposite to a side where a polymer membrane 201 exists, and an elastically deformable reinforcing member 205 is provided over the inside and outside of the peripheral edge of a fuel electrode catalyst layer 203C so as to be located on one side of the fuel electrode catalyst layer 203C, the side being opposite to a side where the polymer membrane 201 exists. PTL 1 describes that: the reinforcing members 204 and 205 elastically deform; therefore, even if the tensile stress and the compressive stress are repeatedly applied to the polymer membrane 201, the application of the stress to an oxygen electrode boundary membrane portion 201W and fuel electrode boundary membrane portion 201W of the polymer membrane 201 is suppressed; and on this account, the damages, such as distortions or cracks, of the oxygen electrode boundary membrane portion 201W and fuel electrode boundary membrane portion 201W of the polymer membrane 201 are prevented.

CITATION LIST

Patent Literature

PTL 1: Japanese Laid-Open Patent Application Publication No. 2003-68318

SUMMARY OF INVENTION

Technical Problem

However, even in the cell of the polymer electrolyte fuel cell disclosed in PTL 1, the polymer membrane is damaged, and the cell performance decreases. In this regard, there is still room for improvement.

The present invention was made to solve the above problems, and an object of the present invention is to provide a polymer electrolyte fuel cell and a separator, each of which is capable of suppressing deterioration factors at a portion where the polymer electrolyte membrane tends to deteriorate and suppressing the decrease in the cell performance.

Solution to Problem

The present inventors have diligently studied to solve the problem of the above prior art, and as a result, found the following points.

The present inventors have conducted an endurance test of the cell 200 of the polymer electrolyte fuel cell of PTL 1 shown in FIG. 21. The present inventors have found that when viewed from a thickness direction of the cell 200, the thickness of a portion 201P facing (overlapping) an inner end portion 204E of the reinforcing member 204 of the polymer membrane 201 and an inner end portion 205E of the reinforcing member 205 of the polymer membrane 201 was smaller than that of the other portion. This indicates that: the inner end portions 204E and 205E of the reinforcing members 204 and 205 apply high stress to the portion 201P of the polymer membrane 201 via the oxygen electrode catalyst layer 202C and the fuel electrode catalyst layer 203C; therefore, the thickness of the portion 201P becomes smaller than that of the other portion; and as a result, the cross leakage of the reactant gas occurs at the portion 201P. To be specific, in the cell 200 disclosed in PTL 1, the cross leakage of the reactant gas occurs around the portion 201P of the polymer membrane 201. By the reactant gas leaked by the cross leakage, hydrogen peroxide is generated on the catalyst of the oxygen electrode catalyst layer 202C and/or the fuel electrode catalyst layer 203C, and radicals generated by, for example, Fenton reaction attack the polymer membrane 201. As a result, the present inventors have found that the polymer membrane 201 deteriorates and this causes the decrease in the cell performance.

The present inventors have found that adopting the configuration described below is highly effective to achieve the object of the present invention. Thus, the present invention was made.

To be specific, a polymer electrolyte fuel cell according to the present invention includes: a membrane-electrode assembly including a polymer electrolyte membrane and a pair of electrodes sandwiching the polymer electrolyte membrane; and separators each formed in a plate shape and having electrical conductivity, wherein: each of the electrodes includes a gas diffusion layer and a catalyst layer having one main surface contacting the polymer electrolyte membrane and is formed such that an outer periphery thereof is located on an inner side of an outer periphery of the polymer electrolyte membrane when viewed from a thickness direction of the separator; the membrane-electrode assembly is sandwiched between a pair of the separators; a reactant gas supply manifold hole and a reactant gas discharge manifold hole are formed on main surfaces of each of the separators so as to penetrate the separator in the thickness direction, and a plurality of groove-like first connection channels connected to the reactant gas supply manifold hole and a plurality of groove-like second connection channels connected to the reactant gas discharge manifold hole are formed on one main surface of each of the separators, the main surface contacting the electrode; a plurality of groove-like reactant gas channels each having one end communicating with the first connection channel and the other end communicating with the second connection channel are formed on a main surface of at least one of the separator and the gas diffusion layer; and in a case where among the plurality of reactant gas channels, a reactant gas channel formed to overlap a peripheral portion of the electrode twice and formed such that a length of a portion overlapping the peripheral portion is a predetermined length or shorter when viewed from the thickness direction of the separator and tracing the reactant gas channel from an upstream end thereof to a downstream end thereof is defined as a first reactant gas channel, and among the plurality of reactant gas channels, a reactant gas channel formed to overlap the peripheral portion of the electrode and formed such that a length of a portion overlapping the peripheral portion is longer than the predetermined length when viewed from the thickness direction of the separator and tracing the reactant gas channel from an upstream end thereof to a downstream end thereof is defined as a second reactant gas channel, each of the plurality of reactant gas channels is formed such that a flow rate of a reactant gas flowing through the second reactant gas channel is lower than that of the reactant gas flowing through the first reactant gas channel, or each of the plurality of reactant gas channels includes an upstream channel, a downstream channel, and a midstream channel that is a portion other than the upstream channel and the downstream channel, the upstream channel including a portion which first contacts the peripheral portion of the electrode when viewed from the thickness direction of the separator and tracing the reactant gas channel from an upstream end thereof to a downstream side, the downstream channel including a portion which first contacts the peripheral portion of the electrode when viewed from the thickness direction of the separator and tracing the reactant gas channel from a downstream end thereof to an upstream side, and is formed such that the midstream channel does not overlap the peripheral portion of the electrode.

As described above, in the polymer electrolyte fuel cell, high stress is applied to a portion of the polymer electrolyte membrane, the portion facing the peripheral portion of the electrode (especially, the peripheral portion of the catalyst layer) when viewed from the thickness direction of the separator. With this, the portion of the polymer electrolyte membrane breaks. This increases the amount of reactant gas leaked by cross leakage, and radicals are generated from hydrogen peroxide that is a reaction by-product. Thus, it is thought that since the generated radicals attack the polymer electrolyte membrane, the polymer electrolyte membrane is damaged and deteriorated, and the performance of the fuel cell decreases.

Here, in the polymer electrolyte fuel cell according to the present invention, the flow rate of the reactant gas flowing through the second reactant gas channel formed at a portion of the separator, the portion overlapping the peripheral portion of the electrode when viewed from the thickness direction of the separator, can be lowered, or the reactant gas channel is not formed at the portion of the separator, the portion overlapping the peripheral portion of the electrode. Thus, the flow rate of the reactant gas supplied to the peripheral portion of the electrode can be lowered. With this, the amount of reactant gas leaked by cross leakage can be reduced, the reactant gas being a material of hydrogen peroxide, and the generation of the radicals from hydrogen peroxide is reduced. Therefore, in the polymer electrolyte fuel cell according to the present invention, the durability of the polymer electrolyte membrane can be improved, and the decrease in the cell performance can be suppressed.

In the polymer electrolyte fuel cell according to the present invention, the first reactant gas channel may be formed such that a fluid resistance of the reactant gas flowing therethrough is higher than that of the reactant gas flowing through the second reactant gas channel.

As described above, in the polymer electrolyte fuel cell according to the present invention, since the plurality of reactant gas channels (the first reactant gas channels and the second reactant gas channels) are connected to the reactant gas supply manifold hole and the reactant gas discharge manifold hole, the pressure loss of the first reactant gas channel and the pressure loss of the second reactant gas channel are the same as each other. However, since the polymer electrolyte fuel cell according to the present invention is configured such that the fluid resistance of the reactant gas flowing through the first reactant gas channel is higher than that of the reactant gas flowing through the second reactant gas channel, the flow rate of the reactant gas flowing through the first reactant gas channel is lower than that of the reactant gas flowing through the second reactant gas channel. Therefore, in the polymer electrolyte fuel cell according to the present invention, the durability of the polymer electrolyte membrane can be improved, and the decrease in the cell performance can be suppressed.

In the polymer electrolyte fuel cell according to the present invention, the first reactant gas channel may be formed such that a cross-sectional area thereof is smaller than that of the second reactant gas channel.

In the polymer electrolyte fuel cell according to the present invention, the first reactant gas channel may be formed such that a length thereof is longer than that of the second reactant gas channel.

In the polymer electrolyte fuel cell according to the present invention, the plurality of reactant gas channels may be formed so as to extend in parallel with one another.

The polymer electrolyte fuel cell according to the present invention may further include a reinforcing member, wherein the reinforcing member may be provided at a peripheral portion of the polymer electrolyte membrane when viewed from the thickness direction of the separator.

In the polymer electrolyte fuel cell according to the present invention, the reinforcing member may be provided such that a part thereof contacts the other main surface of the catalyst layer and overlaps the catalyst layer when viewed from the thickness direction of the separator.

In the polymer electrolyte fuel cell according to the present invention, the reinforcing member may be provided so as not to overlap the catalyst layer when viewed from the thickness direction of the separator.

In the polymer electrolyte fuel cell according to the present invention, the reinforcing member may be made of resin.

In the polymer electrolyte fuel cell according to the present invention, the plurality of reactant gas channels may be formed on one main surface of the separator.

In the polymer electrolyte fuel cell according to the present invention, the plurality of reactant gas channels may be formed on one main surface of the gas diffusion layer.

Further, in the polymer electrolyte fuel cell according to the present invention, the plurality of reactant gas channels may be formed on each of one main surface of the separator and one main surface of the gas diffusion layer.

The above object, other objects, features and advantages of the present invention will be made clear by the following detailed explanation of preferred embodiments with reference to the attached drawings.

Advantageous Effects of Invention

According to the polymer electrolyte fuel cell of the present invention, the deterioration of the polymer electrolyte membrane can be suppressed, the durability thereof can be improved, and the decrease in performance of the fuel cell can be suppressed.

DESCRIPTION OF EMBODIMENTS

Figure 1:
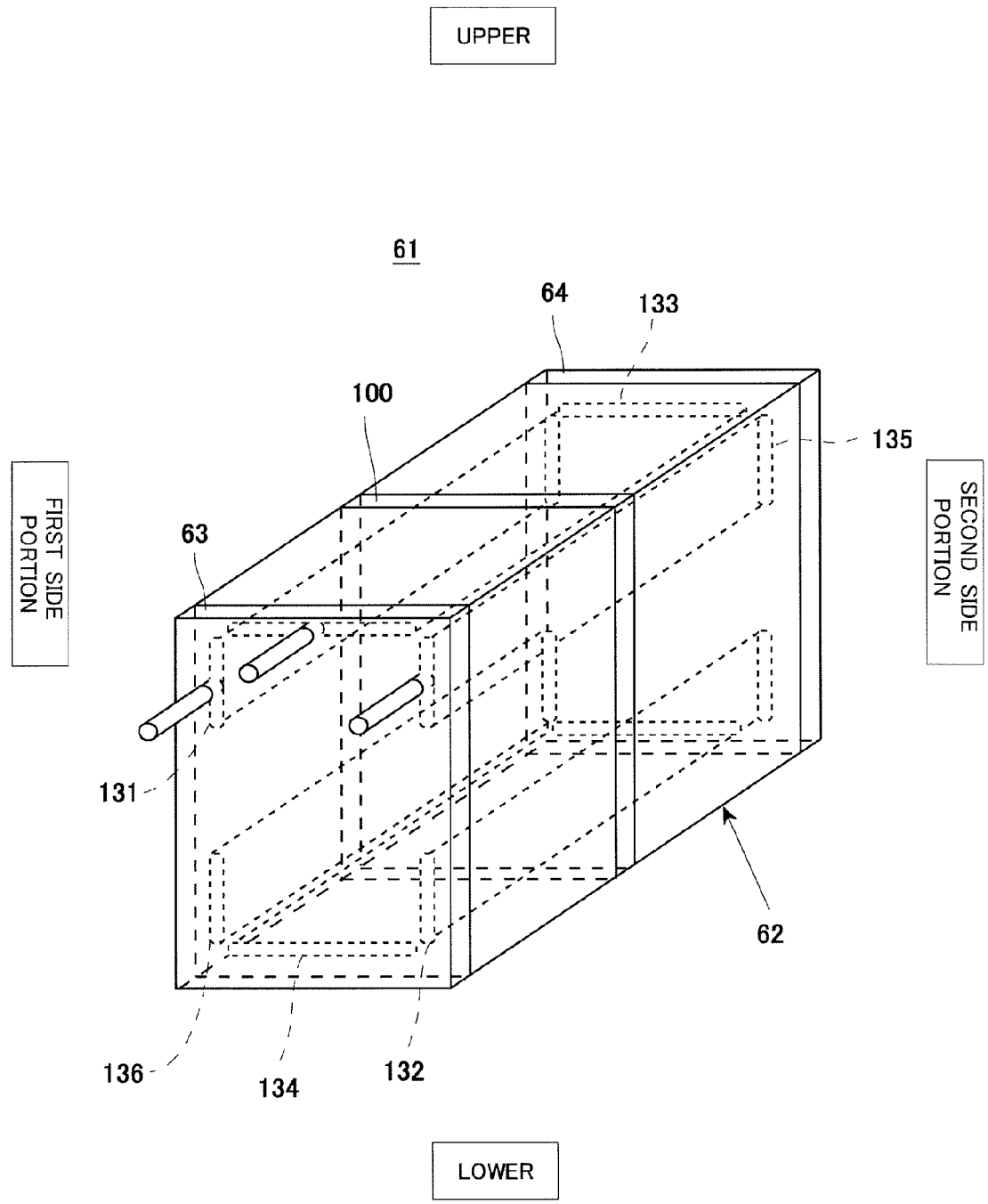
FIG. 1 is a perspective view schematically showing the schematic configuration of a fuel cell stack including a polymer electrolyte fuel cell according to Embodiment 1 of the present invention.

Hereinafter, preferred embodiments of the present invention will be explained in reference to the drawings. In the drawings, the same reference signs are used for the same or corresponding components, and a repetition of the same explanation is avoided. In addition, the present invention is not limited to the embodiments below.

Embodiment 1

Configuration of Fuel Cell Stack

FIG. 1 is a perspective view schematically showing the schematic configuration of a fuel cell stack including a polymer electrolyte fuel cell (hereinafter simply referred to as a "fuel cell") according to Embodiment 1 of the present invention. In FIG. 1, the upper-lower direction of the fuel cell stack is shown as the upper-lower direction of the drawing.

As shown in FIG. 1, a fuel cell stack 61 according to Embodiment 1 of the present invention includes a cell stack body 62, first and second end plates 63 and 64, and fastening members. The cell stack body 62 is formed by stacking fuel cells 100 in a thickness direction of the fuel cell 100. The entire shape of each fuel cell 100 is a plate shape. The first and second end plates 63 and 64 are respectively provided on both ends of the cell stack body 62. The fastening members fasten the cell stack body 62 and the first and second end plates 63 and 64 in a stack direction of the fuel cells 100 and are not shown. A current collector and an insulating plate are provided each of between the first end plate 63 and the cell stack body 62 and between the second end plate 64 and the cell stack body 62 and are not shown. The plate-shaped fuel cell 100 extends in parallel with a vertical surface, and the stack direction of the fuel cells 100 corresponds to a horizontal direction.

A fuel gas supply manifold 131 is formed on an upper portion of one side portion (a left side portion in the drawing; hereinafter referred to as a "first side portion") of the cell stack body 62 so as to penetrate the cell stack body 62 in the stack direction of the fuel cells 100, and a cooling medium discharge manifold 136 is formed on a lower portion of the first side portion. An oxidizing gas supply manifold 133 is formed on an upper inner side of the fuel gas supply manifold 131 of the first side portion of the cell stack body 62 so as to penetrate the cell stack body 62 in the stack direction of the fuel cells 100. Similarly, an oxidizing gas discharge manifold 134 is formed on a lower inner side of the cooling medium discharge manifold 136 so as to penetrate the cell stack body 62 in the stack direction of the fuel cells 100. Further, a cooling medium supply manifold 135 is formed on an upper portion of the other side portion (a right side portion in the drawing; hereinafter referred to as a "second side portion") of the cell stack body 62 so as to penetrate the cell stack body 62 in the stack direction of the fuel cells 100, and a fuel gas discharge manifold 132 is formed on a lower portion of the second side portion so as to penetrate the cell stack body 62 in the stack direction of the fuel cells 100.

Suitable pipes are provided at respective manifolds. With this, a fuel gas, an oxidizing gas, and a cooling medium are supplied to and discharged from the fuel cell stack 61 through the suitable pipes.

Configuration of Polymer Electrolyte Fuel Cell

Next, the configuration of the polymer electrolyte fuel cell according to Embodiment 1 of the present invention will be explained in reference to FIG. 2.

Figure 2:
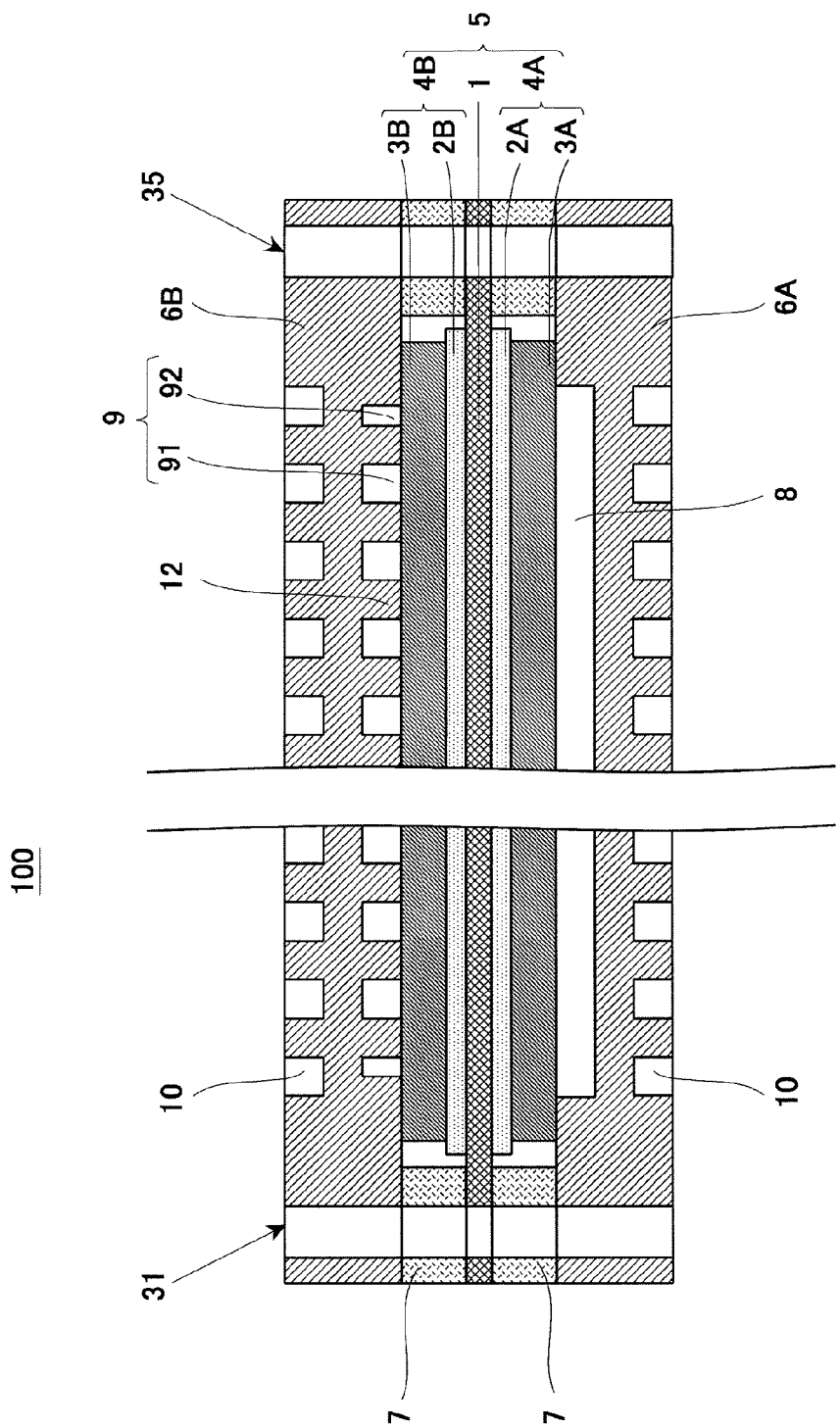
FIG. 2 is a cross-sectional view schematically showing the schematic configuration of the polymer electrolyte fuel cell in the fuel cell stack shown in FIG. 1.

FIG. 2 is a cross-sectional view schematically showing the schematic configuration of the fuel cell in the fuel cell stack shown in FIG. 1.

As shown in FIG. 2, the fuel cell 100 according to Embodiment 1 includes a MEA (Membrane-Electrode Assembly) 5, gaskets 7, an anode separator 6A, and a cathode separator 6B.

The MEA 5 includes a polymer electrolyte membrane 1 which selectively transports hydrogen ions, an anode electrode 4A, and a cathode electrode 4B. The polymer electrolyte membrane 1 has a substantially quadrangular shape (herein, rectangular shape). The anode electrode 4A and the cathode electrode 4B are respectively provided on both surfaces of the polymer electrolyte membrane 1 so as to be located on an inner side of the peripheral portion of the polymer electrolyte membrane 1. Respective manifold holes, such as a fuel gas supply manifold hole 31 and a cooling medium supply manifold hole 35, are formed on the peripheral portion of the polymer electrolyte membrane 1 so as to penetrate the polymer electrolyte membrane 1 in the thickness direction.

The anode electrode 4A includes an anode catalyst layer 2A and an anode gas diffusion layer 3A. The anode catalyst layer 2A is provided on one main surface of the polymer electrolyte membrane 1 and contains catalyst supporting carbon and a polymer electrolyte adhered to the catalyst supporting carbon. The catalyst supporting carbon is made of carbon powder (electrically conductive carbon particles) supporting platinum-based metal catalysts (electrode catalysts). The anode gas diffusion layer 3A has gas permeability and electrical conductivity. The anode catalyst layer 2A is provided such that one main surface thereof contacts the polymer electrolyte membrane 1. The anode gas diffusion layer 3A is provided on the other main surface of the anode catalyst layer 2A. Similarly, the cathode electrode 4B includes a cathode catalyst layer 2B and a cathode gas diffusion layer 3B. The cathode catalyst layer 2B is provided on the other main surface of the polymer electrolyte membrane 1 and contains the catalyst supporting carbon and the polymer electrolyte adhered to the catalyst supporting carbon. The catalyst supporting carbon is made of the carbon powder (electrically conductive carbon particles) supporting the platinum-based metal catalysts (electrode catalysts). The cathode gas diffusion layer 3B is provided on the cathode catalyst layer 2B and has the gas permeability and the electrical conductivity. The cathode catalyst layer 2B is provided such that one main surface thereof contacts the polymer electrolyte membrane 1. The cathode gas diffusion layer 3B is provided on the other main surface of the cathode catalyst layer 2B.

In Embodiment 1, when viewed from the thickness direction of the cathode separator 6B, the anode catalyst layer 2A is formed such that an outer end thereof is located on an outer side of (protrudes farther than) an outer end of the anode gas diffusion layer 3A, and the cathode catalyst layer 2B is formed such that an outer end thereof is located on an outer side of an outer end of the cathode gas diffusion layer 3B. However, the present embodiment is not limited to this. The anode catalyst layer 2A may be formed such that the outer end thereof is located on an inner side of the anode gas diffusion layer 3A, and the cathode catalyst layer 2B may be formed such that the outer end thereof is located on an inner side of the cathode gas diffusion layer 3B.

The pair of gaskets 7 made of fluorocarbon rubber and each having a doughnut shape are respectively provided around the anode electrode 4A and cathode electrode 4B of the MEA 5 (to be precise, the anode gas diffusion layer 3A and the cathode gas diffusion layer 3B) so as to sandwich the polymer electrolyte membrane 1. With this, the fuel gas and the oxidizing gas can be prevented from leaking to the outside of the cell and can also be prevented from being mixed with each other in the fuel cell 100. The manifold holes, such as the fuel gas supply manifold hole 31 and the cooling medium supply manifold hole 35, which are through holes extending in the thickness direction, are formed on the peripheral portions of the gaskets 7.

The anode separator 6A and the cathode separator 6B each having electrical conductivity are provided so as to sandwich the MEA 5 and the gaskets 7. With this, the MEA 5 is mechanically fixed, and when the plurality of fuel cells 100 are stacked in the thickness direction, the MEAs 5 are electrically connected to one another. As each of the separators 6A and 6B, a metal, graphite, or a combination of graphite and resin, each of which excels in thermal conductivity and electrical conductivity, can be used. For example, as each of the separators 6A and 6B, a separator produced by injection molding using a mixture of carbon powder and binder (solvent) or a separator produced by performing gold plating with respect to the surface of a titanium plate or a stainless steel plate can be used.

Groove-like fuel gas channels 8 through which the fuel gas flows are formed on one main surface (hereinafter referred to as an "inner surface") of the anode separator 6A, the inner surface contacting the anode electrode 4A. A groove-like cooling medium channel 10 through which the cooling medium flows is formed on the other main surface (hereinafter referred to as an "outer surface") of the anode separator 6A. Similarly, groove-like oxidizing gas channels 9 through which the oxidizing gas flows are formed on one main surface (hereinafter referred to as an "inner surface") of the cathode separator 6B, the inner surface contacting the cathode electrode 4B. The groove-like cooling medium channel 10 through which the cooling medium flows is formed on the other main surface (hereinafter referred to as an "outer surface") of the cathode separator 6B.

With this, the fuel gas and the oxidizing gas are respectively supplied to the anode electrode 4A and the cathode electrode 4B, and these gases react with each other to generate electricity and heat. The cooling medium, such as water or antifreezing fluid (for example, ethylene glycol-containing liquid), is caused to flow through the cooling medium channel 10 to recover the generated heat.

The fuel cell 100 configured as above may be used as a unit cell (cell), or the fuel cells 100 configured as above may be used as the fuel cell stack 61 formed by stacking a plurality of fuel cells 100. In the case of stacking the fuel cells 100, one cooling medium channel 10 may be formed for every two or three unit cells. Further, in a case where the cooling medium channel 10 is not formed between the unit cells, a separator serving as both the anode separator 6A and the cathode separator 6B and configured such that the fuel gas channels 8 are formed on one main surface thereof and the oxidizing gas channels 9 are formed on the other main surface thereof may be used as a separator sandwiched between two MEAs 5.

Configuration of Separator

Next, the anode separator 6A and the cathode separator 6B will be explained in detail in reference to FIGS. 2 to 4.

Figure 3:
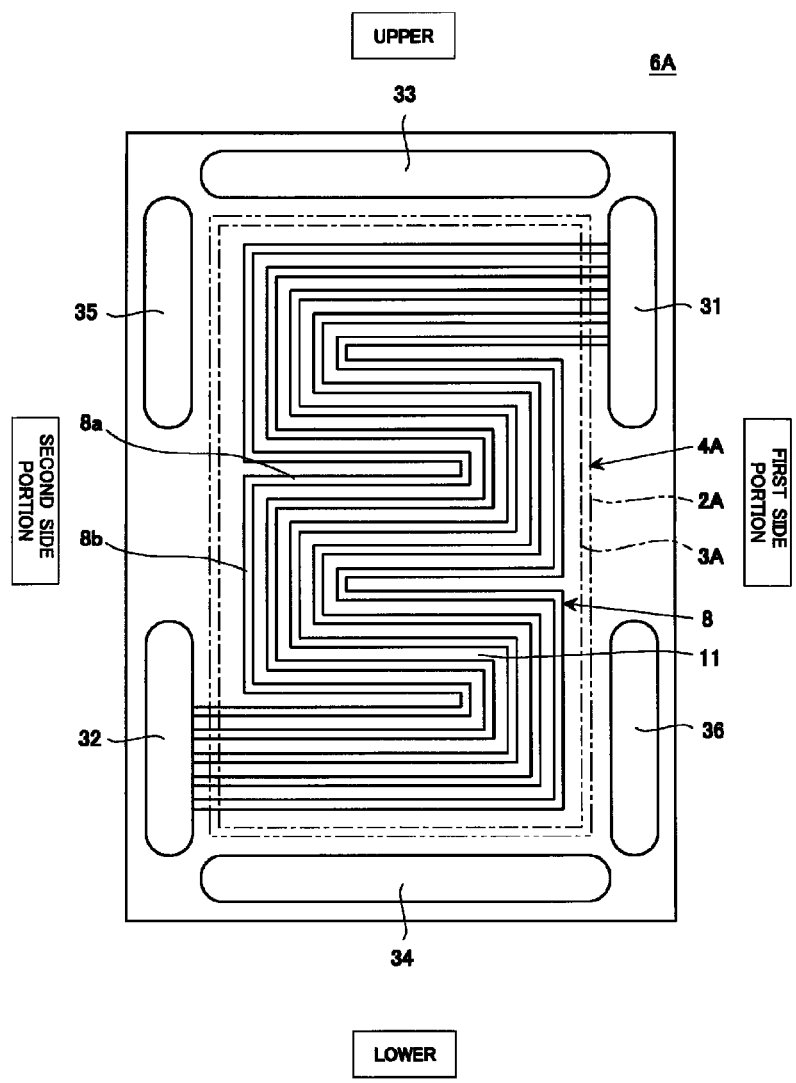
FIG. 3 is a schematic diagram showing the schematic configuration of an anode separator of the polymer electrolyte fuel cell shown in FIG. 2.

FIG. 3 is a schematic diagram showing the schematic configuration of the anode separator of the fuel cell shown in FIG. 2. FIG. 4 is a schematic diagram showing the schematic configuration of the cathode separator of the fuel cell shown in FIG. 2. In FIGS. 3 and 4, the upper-lower direction of each of the anode separator 6A and the cathode separator 6B is shown as the upper-lower direction of the drawing. In FIG. 4, the peripheral portion of the cathode electrode 4B is shown by hatching.

First, the configuration of the anode separator 6A will be explained in detail in reference to FIGS. 2 and 3.

As shown in FIG. 3, the anode separator 6A is formed to have a plate shape and a substantially quadrangular shape (herein, rectangular shape). The manifold holes, such as the fuel gas supply manifold hole 31, are formed on the peripheral portion of the anode separator 6A so as to penetrate the anode separator 6A in the thickness direction. Specifically, the fuel gas supply manifold hole (reactant gas supply manifold hole) 31 is formed on an upper portion of one side portion (hereinafter referred to as a "first side portion") of the anode separator 6A, and a cooling medium discharge manifold hole 36 is formed on a lower portion of the first side portion. An oxidizing gas supply manifold hole (reactant gas supply manifold hole) 33 is formed on an upper inner side of the fuel gas supply manifold hole 31. Similarly, an oxidizing gas discharge manifold hole (reactant gas discharge manifold hole) 34 is formed on a lower inner side of the cooling medium discharge manifold hole 36. Further, the cooling medium supply manifold hole 35 is formed on an upper portion of the other side portion (hereinafter referred to as a "second side portion") of the anode separator 6A, and a fuel gas discharge manifold hole (reactant gas discharge manifold hole) 32 is formed on a lower portion of the second side portion.

As shown in FIGS. 2 and 3, the groove-like fuel gas channels 8 are formed in a serpentine shape on the inner surface of the anode separator 6A so as to connect the fuel gas supply manifold hole 31 and the fuel gas discharge manifold hole 32. In Embodiment 1, the fuel gas channels 8 are constituted by a plurality of (herein, four) grooves, and each of the grooves is practically constituted by straight portions 8a and turn portions 8b.

Specifically, each of the grooves constituting the fuel gas channels 8 extends from the fuel gas supply manifold hole 31 toward the second side portion in the horizontal direction by a certain distance, extends therefrom in the lower direction by a certain distance, extends therefrom toward the first side portion in the horizontal direction by a certain distance, and extends therefrom in the lower direction by a certain distance. This pattern is repeated once more, and the groove extends therefrom toward the second side portion in the horizontal direction so as to reach the fuel gas discharge manifold hole 32. In the fuel gas channels 8, the portion extending in the horizontal direction constitutes the straight portion 8a, and the portion extending in the lower direction constitutes the turn portion 8b. As shown in FIGS. 2 and 3, a portion between the groove (to be precise, the straight portion 8a) and the groove (to be precise, the straight portion 8a) constituting the fuel gas channels 8 forms a first rib portion 11 contacting the anode electrode 4A.

In Embodiment 1, the fuel gas channels 8 are constituted by a plurality of (herein, four) grooves. However, the present embodiment is not limited to this. One groove may be formed as the fuel gas channel 8 on the inner surface of the anode separator 6A.

Next, the configuration of the cathode separator 6B will be explained in detail in reference to FIGS. 2 and 4.

Figure 4:
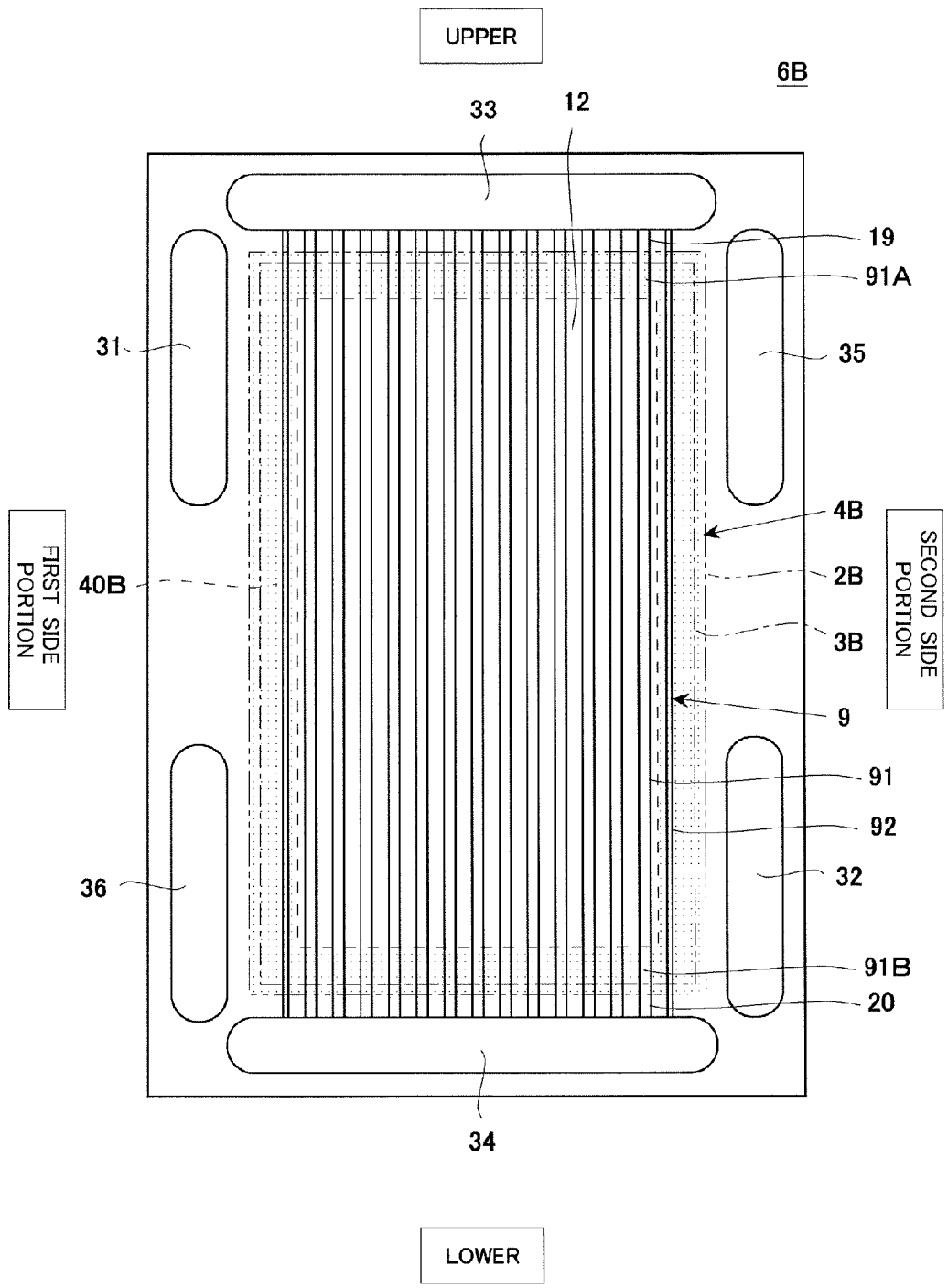
FIG. 4 is a schematic diagram showing the schematic configuration of a cathode separator of the polymer electrolyte fuel cell shown in FIG. 2.

As shown in FIGS. 2 and 4, the cathode separator 6B is formed to have a plate shape and a substantially quadrangular shape (herein, rectangular shape). The manifold holes, such as the fuel gas supply manifold hole 31, are formed on the peripheral portion of the cathode separator 6B so as to penetrate the cathode separator 6B in the thickness direction. Since the arrangement of respective manifold holes is the same as that of the anode separator 6A, a detailed explanation thereof is omitted.

First connection channels 19, second connection channels 20, and the oxidizing gas channels 9 are formed on the inner surface of the cathode separator 6B. One end of each of the first connection channels 19 is connected to the oxidizing gas supply manifold hole 33. One end of each of the second connection channels 20 is connected to the oxidizing gas discharge manifold hole 34. The first connection channels 19 are constituted by a plurality of (herein, 15) grooves and are formed to extend in the upper-lower direction, and the second connection channels 20 are constituted by a plurality of (herein, 15) grooves and are formed to extend in the upper-lower direction. The other end of each of the first connection channels 19 is a portion overlapping with an outer periphery of the cathode electrode 4B (to be precise, the cathode gas diffusion layer 3B) when viewed from the thickness direction of the cathode separator 6B. Similarly, the other end of each of the second connection channels 20 is a portion overlapping with the outer periphery of the cathode electrode 4B (to be precise, the cathode gas diffusion layer 3B) when viewed from the thickness direction of the cathode separator 6B.

The oxidizing gas channels 9 are constituted by a plurality of (herein, 15) grooves, and the plurality of grooves are linearly formed so as to connect the first connection channels 19 and the second connection channels 20. The plurality of oxidizing gas channels 9 are formed so as to extend in parallel with one another. Here, "extend in parallel with one another" denotes that the plurality of oxidizing gas channels are provided in parallel with one another. To be specific, "extend in parallel with one another" denotes that one of the plurality of oxidizing gas channels is specified, and the other oxidizing gas channels are provided along the specified oxidizing gas channel.

In other words, "extend in parallel with one another" denotes that the plurality of oxidizing gas channels 9 are formed such that the flow directions of the oxidizing gases flowing through respective channels from the upstream end toward the downstream end are the same as one another as a whole. Therefore, the plurality of oxidizing gas channels 9 do not have to be provided completely in parallel with one another from the upstream end up to the downstream end, and there may be a portion where the plurality of oxidizing gas channels 9 are not in parallel with one another. In Embodiment 1, the oxidizing gas channels 9 are formed so as to extend in parallel with one another. However, the present embodiment is not limited to this. The oxidizing gas channels 9 may be formed so as not to extend in parallel with one another.

In addition, the fuel gas channels 8 and the oxidizing gas channels 9 are formed to realize so-called parallel flow. Here, the parallel flow denotes that the fuel gas channels 8 and the oxidizing gas channels 9 are configured such that the flow direction of the oxidizing gas from upstream to downstream and the flow direction of the fuel gas from upstream to downstream are the same as each other when macroscopically (as a whole) viewed from the thickness direction of the fuel cell 100. A portion between the grooves constituting the oxidizing gas channels 9 forms a second rib portion 12 contacting the cathode electrode 4B.

As shown in FIG. 4, the oxidizing gas channels 9 include first oxidizing gas channels (first reactant gas channels) 91 and second oxidizing gas channels (second reactant gas channels) 92. When viewed from the thickness direction of the cathode separator 6B and tracing the first oxidizing gas channel 91 from the upstream end to the downstream end, the first oxidizing gas channel 91 is formed to overlap a peripheral portion 40B of the cathode electrode 4B twice and is formed such that the length of a portion overlapping the peripheral portion 40B of the cathode electrode 4B is equal to or shorter than a predetermined length L.

More specifically, in Embodiment 1, the first oxidizing gas channel 91 includes a portion 91A and a portion 91B. The portion 91A is a portion which first contacts the cathode electrode 4B when viewed from the thickness direction of the cathode separator 6B and tracing the first oxidizing gas channel 91 from the upstream end to the downstream side, and the portion 91B is a portion which first contacts the cathode electrode 4B when viewed from the thickness direction of the cathode separator 6B and tracing the first oxidizing gas channel 91 from the downstream end to the upstream side. In addition, the first oxidizing gas channel 91 is formed such that the sum of the length of the portion 91A and the length of the portion 91B is equal to or shorter than the predetermined length L.

Here, the peripheral portion 40B of the cathode electrode 4B denotes a region between the outer end of the cathode electrode 4B and a portion located away from the outer end inward by a predetermined distance N. In other words, the peripheral portion 40B of the cathode electrode 4B denotes a region whose width from the outer end of the cathode electrode 4B is the predetermined distance N. To suppress the deterioration of the polymer electrolyte membrane 1, the predetermined distance N may be 5 mm or shorter, more preferably 3 mm or shorter. To suppress the deterioration of the polymer electrolyte membrane 1, the area of the peripheral portion 40B of the cathode electrode 4B may be equal to or smaller than 1/5 of the area of the cathode electrode 4B, more preferably equal to or smaller than 1/10 of the area of the cathode electrode 4B.

Further, it is preferable that the predetermined length L be equal to or longer than twice the length (predetermined distance N) of the width of the peripheral portion 40B of the cathode electrode 4B and equal to or shorter than five times the length (predetermined distance N) of the width of the peripheral portion 40B of the cathode electrode 4B. To be specific, to suppress the deterioration of the polymer electrolyte membrane 1, it is preferable that the predetermined length L be equal to or longer than 6 mm and equal to or shorter than 25 mm. Since the electrochemical reaction of the reactant gas is performed in the cathode catalyst layer 2B, it is preferable that the outer end of the cathode electrode 4B be based on the outer end of the cathode catalyst layer 2B.

When viewed from the thickness direction of the cathode separator 6B, the second oxidizing gas channel 92 is formed to overlap the peripheral portion 40B of the cathode electrode 4B and is formed such that the length of a portion overlapping the peripheral portion 40B of the cathode electrode 4B is longer than the predetermined length L.

The second oxidizing gas channel 92 is formed such that the flow rate of the oxidizing gas flowing therethrough is lower than that of the oxidizing gas flowing through the first oxidizing gas channel 91. Specifically, the second oxidizing gas channel 92 is formed such that the fluid resistance of the oxidizing gas flowing therethrough is higher than that of the oxidizing gas flowing through the first oxidizing gas channel 91. In other words, in the present invention, at least one of a pair of oxidizing gas channels 9 located closest to the outer end of the cathode electrode 4B may be formed such that the flow rate of the oxidizing gas flowing therethrough is lower than that of the oxidizing gas flowing through each of the other oxidizing gas channels 9.

As described above, the upstream end of each of the first oxidizing gas channels 91 and the second oxidizing gas channels 92 is connected to the oxidizing gas supply manifold hole 33 through the first connection channel 19. The downstream end of each of the first oxidizing gas channels 91 and the second oxidizing gas channels 92 is connected to the oxidizing gas discharge manifold hole 34 through the second connection channel 20. Therefore, the pressure loss between the upstream end and downstream end of the first oxidizing gas channel 91 and the pressure loss between the upstream end and downstream end of the second oxidizing gas channel 92 are the same as each other. However, since the fluid resistance of the second oxidizing gas channel 92 is higher than that of the first oxidizing gas channel 91, the flow rate of the oxidizing gas flowing through the second oxidizing gas channel 92 becomes low.

More specifically, the second oxidizing gas channel 92 is formed such that the cross-sectional area thereof is smaller than that of the first oxidizing gas channel 91. In Embodiment 1, the second oxidizing gas channel 92 is formed such that the width thereof is smaller than that of the first oxidizing gas channel 91. Here, the cross-sectional area of the oxidizing gas channel 9 denotes the area of a cross section spreading in a direction perpendicular to a direction in which the oxidizing gas flows. In addition, the width of the oxidizing gas channel 9 denotes a width extending in a direction perpendicular to the thickness direction of the cathode separator 6B and in a direction perpendicular to the direction in which the oxidizing gas flows.

In Embodiment 1, a pair of channels located on an outermost side among the plurality of oxidizing gas channels 9 constitute the second oxidizing gas channels 92. However, the present embodiment is not limited to this. Only one of the pair of channels located on the outermost side may be formed such that the flow rate thereof is lower than that of each of the other channels (to be specific, only one of the pair of channels may constitute the second oxidizing gas channel 92).

In Embodiment 1, one second oxidizing gas channel 92 is formed on a portion of the peripheral portion 40B of the cathode electrode 4B, the portion being located on the first side portion side, and one second oxidizing gas channel 92 is formed on a portion of the peripheral portion 40B of the cathode electrode 4B, the portion being located on the second side portion side. However, the present embodiment is not limited to this. A plurality of second oxidizing gas channels 92 may be formed on the portion located on the first side portion side. Moreover, a plurality of second oxidizing gas channels 92 may be formed on the portion located on the second side portion side.

In Embodiment 1, the plurality of oxidizing gas channels 9 are constituted only by the first oxidizing gas channels 91 and the second oxidizing gas channels 92. However, a channel other than the first oxidizing gas channels 91 and the second oxidizing gas channels 92 may be formed on the inner surface of the cathode separator 6B.

Operational Advantages of Fuel Cell

Next, the operational advantages of the fuel cell 100 according to Embodiment 1 will be explained in reference to FIGS. 1 to 4.

As described above, when viewed from the thickness direction of the cathode separator 6B in the fuel cell 100, a portion of the polymer electrolyte membrane 1 tends to be damaged and deteriorate, the portion facing the peripheral portion of the cathode electrode 4B (anode electrode 4A) (especially, the peripheral portion of the cathode catalyst layer 2B (anode catalyst layer 2A)). With this, it is thought that the performance of the fuel cell 100 decreases.

However, in the fuel cell 100 according to Embodiment 1, the flow rate of the oxidizing gas supplied to the peripheral portion 40B of the cathode electrode 4B can be reduced by reducing the flow rate of the oxidizing gas flowing through the second oxidizing gas channel 92 formed at a portion of the cathode separator 6B, the portion overlapping with the peripheral portion 40B of the cathode electrode 4B when viewed from the thickness direction of the cathode separator 6B. With this, the amount of reactant gas (herein, especially, oxidizing gas) leaked by cross leakage can be reduced at a portion of the polymer electrolyte membrane 1, the portion overlapping with the peripheral portion 40B when viewed from the thickness direction of the cathode separator 6B. Thus, the generation of the radicals from hydrogen peroxide is reduced. On this account, in the fuel cell 100 according to Embodiment 1, the durability of the polymer electrolyte membrane 1 can be improved, and the decrease in the cell performance can be suppressed.

In Embodiment 1, the fuel gas channels 8 are formed to have a serpentine shape. However, the present embodiment is not limited to this. As with the oxidizing gas channels 9, the fuel gas channels 8 may be formed to have a linear shape. Moreover, the oxidizing gas channels 9 are formed to have a linear shape. However, the present embodiment is not limited to this. As with the fuel gas channels 8, the oxidizing gas channels 9 may be formed to have a serpentine shape.

Embodiment 2

Figure 5:
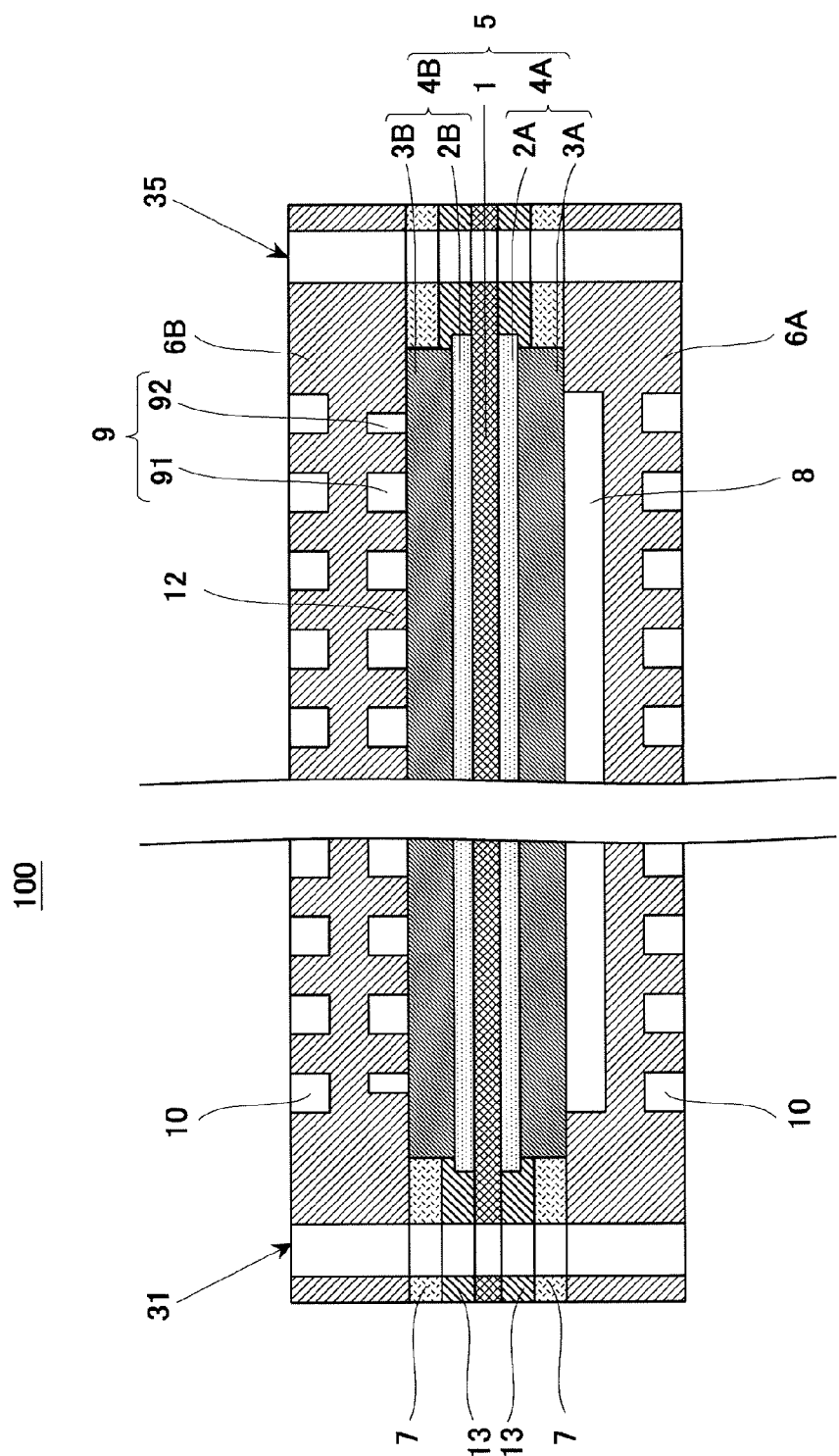
FIG. 5 is a cross-sectional view schematically showing the schematic configuration of the polymer electrolyte fuel cell according to Embodiment 2 of the present invention.

FIG. 5 is a cross-sectional view schematically showing the schematic configuration of the fuel cell according to Embodiment 2 of the present invention.

As shown in FIG. 5, the fuel cell 100 according to Embodiment 2 of the present invention is the same in basic configuration as the fuel cell 100 according to Embodiment 1 but is different from the fuel cell 100 according to Embodiment 1 in that the fuel cell 100 according to Embodiment 2 further includes reinforcing members 13. Specifically, each of the reinforcing members 13 is provided between the polymer electrolyte membrane 1 and the gasket 7 so as to be sandwiched therebetween.

The reinforcing member 13 is formed to have a substantially rectangular shape and a doughnut shape when viewed from the thickness direction of the cathode separator 6B. Moreover, the reinforcing member 13 is formed such that an inner peripheral end thereof is located on an inner side of the outer end of the anode catalyst layer 2A or the cathode catalyst layer 2B when viewed from the thickness direction of the cathode separator 6B. In other words, the reinforcing member 13 is formed such that an inner peripheral portion thereof and an outer peripheral portion of the anode catalyst layer 2A or the cathode catalyst layer 2B overlap each other when viewed from the thickness direction of the cathode separator 6B.

Further, the reinforcing member 13 is provided such that a part thereof contacts the other main surface of the anode catalyst layer 2A or the cathode catalyst layer 2B. In other words, the reinforcing member 13 is provided such that a part thereof is located on the other main surface of the anode catalyst layer 2A or the cathode catalyst layer 2B.

Since the reinforcing member 13 and the anode catalyst layer 2A or the reinforcing member 13 and the cathode catalyst layer 2B are provided so as to overlap each other when viewed from the thickness direction of the cathode separator 6B, as described above, a portion of the polymer electrolyte membrane 1, the portion facing (overlapping) the inner periphery of the reinforcing member 13, may deteriorate. Therefore, in Embodiment 2, it is preferable that the peripheral portion 40B of the cathode electrode 4B be defined to contain the inner periphery of the reinforcing member 13 when viewed from the thickness direction of the cathode separator 6B. Therefore, it is preferable that the peripheral portion 40B of the cathode electrode 4B be defined as a region between the inner peripheral end of the reinforcing member 13 and a portion located away from the inner peripheral end of the reinforcing member 13 inward by the predetermined distance N when viewed from the thickness direction of the cathode separator 6B. To suppress the deterioration of the polymer electrolyte membrane 1, the predetermined distance N may be 5 mm or shorter, more preferably 3 mm or shorter.

To be specific, in the present invention, when the fuel cell 100 includes the reinforcing members 13, and the reinforcing member 13 and the anode catalyst layer 2A or the reinforcing member 13 and the cathode catalyst layer 2B are provided so as to partially overlap each other, the peripheral portion 40B of the cathode electrode 4B is defined as a region between the inner peripheral end of the reinforcing member 13 and the portion located away from the inner peripheral end of the reinforcing member 13 inward by the predetermined distance N when viewed from the thickness direction of the cathode separator 6B. Moreover, when the reinforcing member 13 and the anode catalyst layer 2A or the reinforcing member 13 and the cathode catalyst layer 2B are provided so as not to overlap each other when viewed from the thickness direction of the cathode separator 6B, the peripheral portion 40B of the cathode electrode 4B is defined as the region between the outer end of the cathode electrode 4B and a portion located away from the outer end inward by the predetermined distance N.

The fuel cell 100 according to Embodiment 2 configured as above has the same operational advantages as the fuel cell 100 according to Embodiment 1.

Modification Example 1

Next, a modification example of the fuel cell 100 according to Embodiment 2 will be explained.

Figure 6:
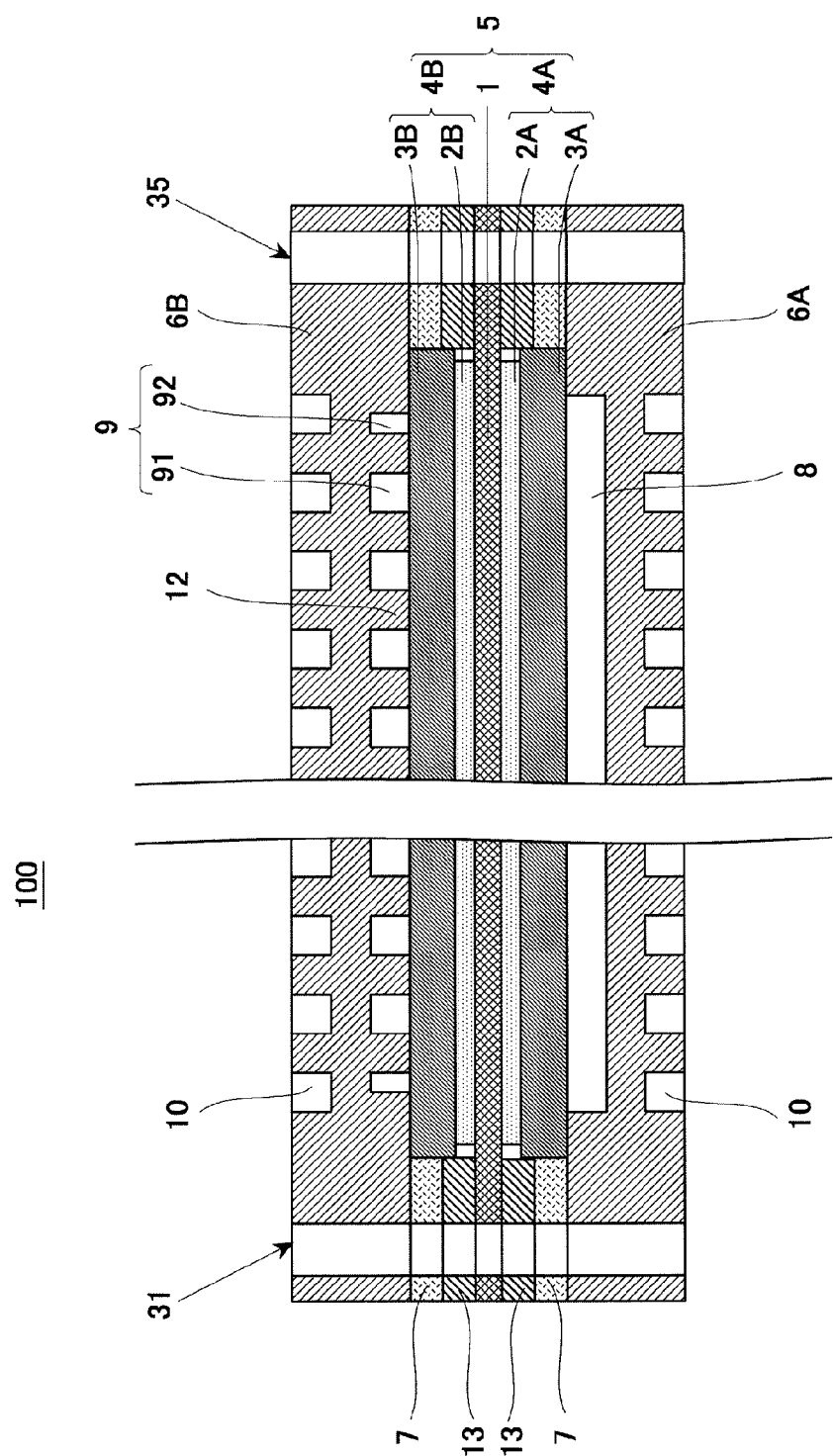
FIG. 6 is a cross-sectional view schematically showing the schematic configuration of the polymer electrolyte fuel cell of Modification Example 1 of the polymer electrolyte fuel cell according to Embodiment 2.

FIG. 6 is a cross-sectional view schematically showing the schematic configuration of the fuel cell of Modification Example 1 of Embodiment 2.

As shown in FIG. 6, the fuel cell 100 of Modification Example 1 is formed such that when viewed from the thickness direction of the cathode separator 6B, the outer end of the anode catalyst layer 2A is located on an inner side of the outer end of the anode gas diffusion layer 3A, and similarly, the outer end of the cathode catalyst layer 2B is located on an inner side of the outer end of the cathode gas diffusion layer 3B. Each of the reinforcing members 13 is formed so as not to overlap the anode catalyst layer 2A or the cathode catalyst layer 2B when viewed from the thickness direction of the cathode separator 6B.

The fuel cell 100 of Modification Example 1 configured as above has the same operational advantages as the fuel cell 100 according to Embodiment 2.

Embodiment 3

Figure 7:
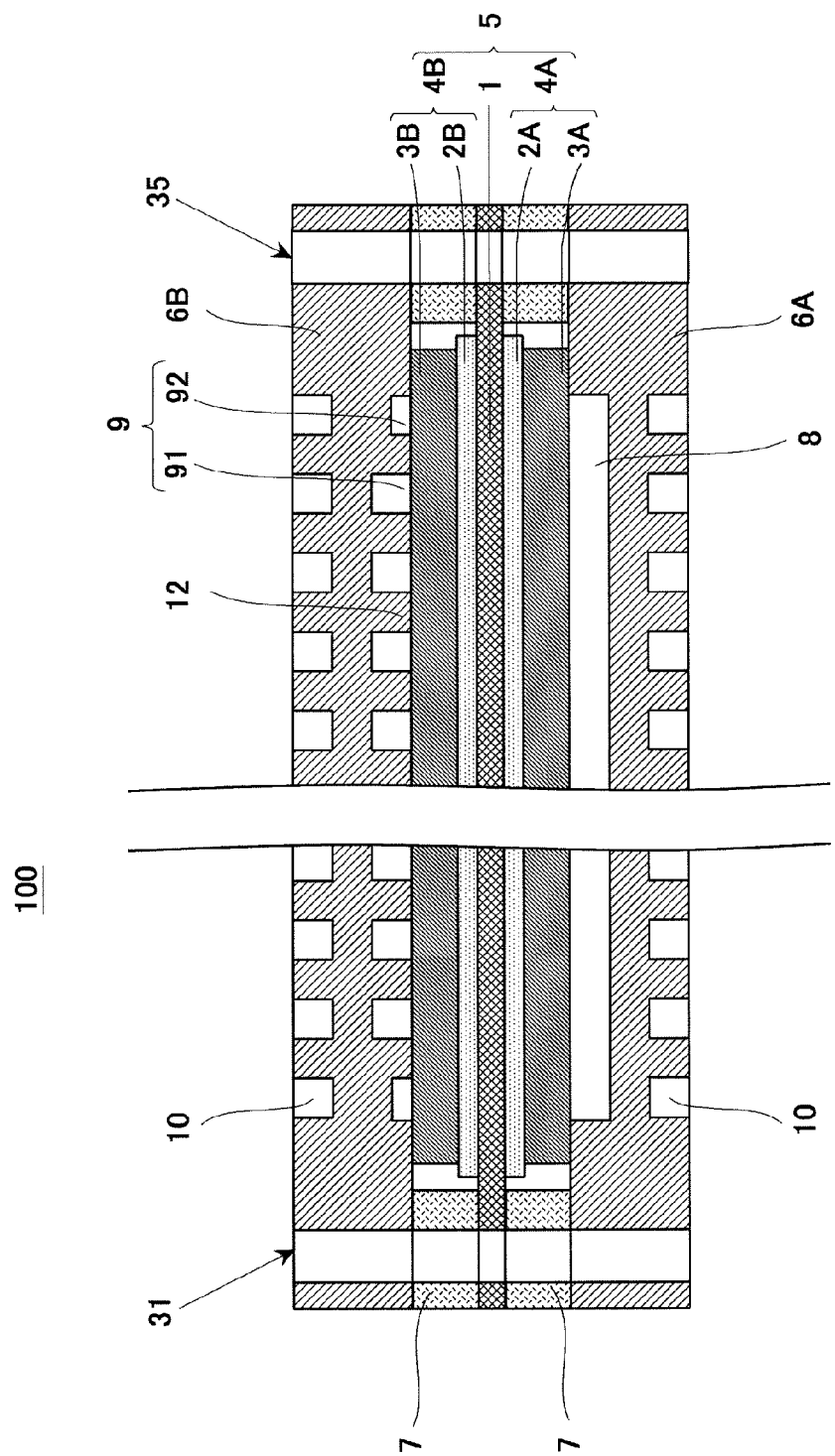
FIG. 7 is a cross-sectional view schematically showing the schematic configuration of the polymer electrolyte fuel cell according to Embodiment 3 of the present invention.

FIG. 7 is a cross-sectional view schematically showing the schematic configuration of the fuel cell according to Embodiment 3 of the present invention.

As shown in FIG. 7, the fuel cell 100 according to Embodiment 3 of the present invention is the same in basic configuration as the fuel cell 100 according to Embodiment 1 but is different from the fuel cell 100 according to Embodiment 1 regarding the configuration of the second oxidizing gas channel 92 of the oxidizing gas channel 9. Specifically, the second oxidizing gas channel 92 is formed such that the depth thereof is smaller than that of the first oxidizing gas channel 91. With this, the cross-sectional area of the second oxidizing gas channel 92 can be made smaller than that of the first oxidizing gas channel 91. To be specific, the flow rate of the oxidizing gas flowing through the second oxidizing gas channel 92 can be made lower than that of the oxidizing gas flowing through the first oxidizing gas channel 91.

The fuel cell 100 according to Embodiment 3 configured as above has the same operational advantages as the fuel cell 100 according to Embodiment 1.

Embodiment 4

Figure 8:
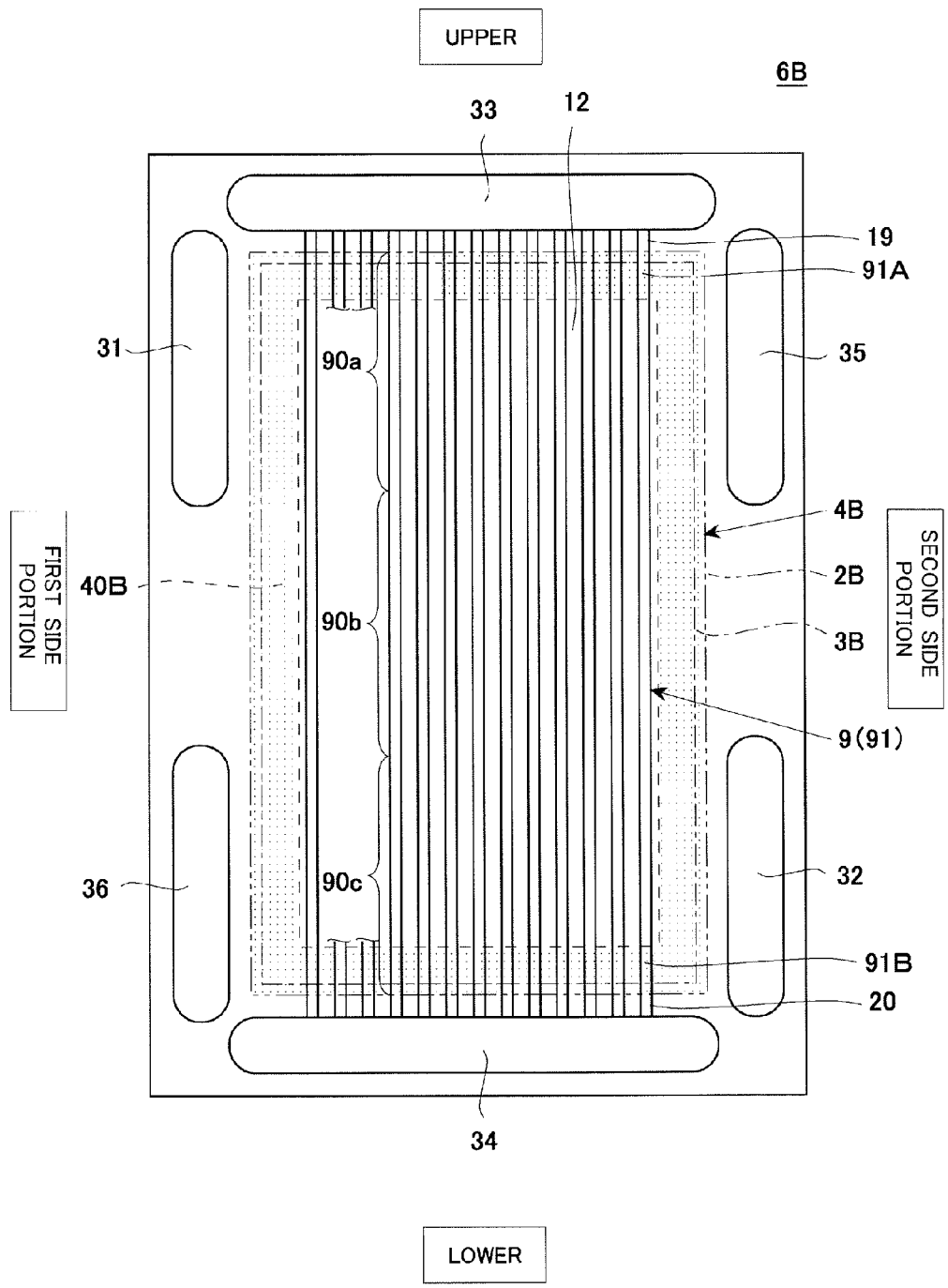
FIG. 8 is a schematic diagram showing the schematic configuration of a separator according to Embodiment 4 of the present invention.
Figure 9:
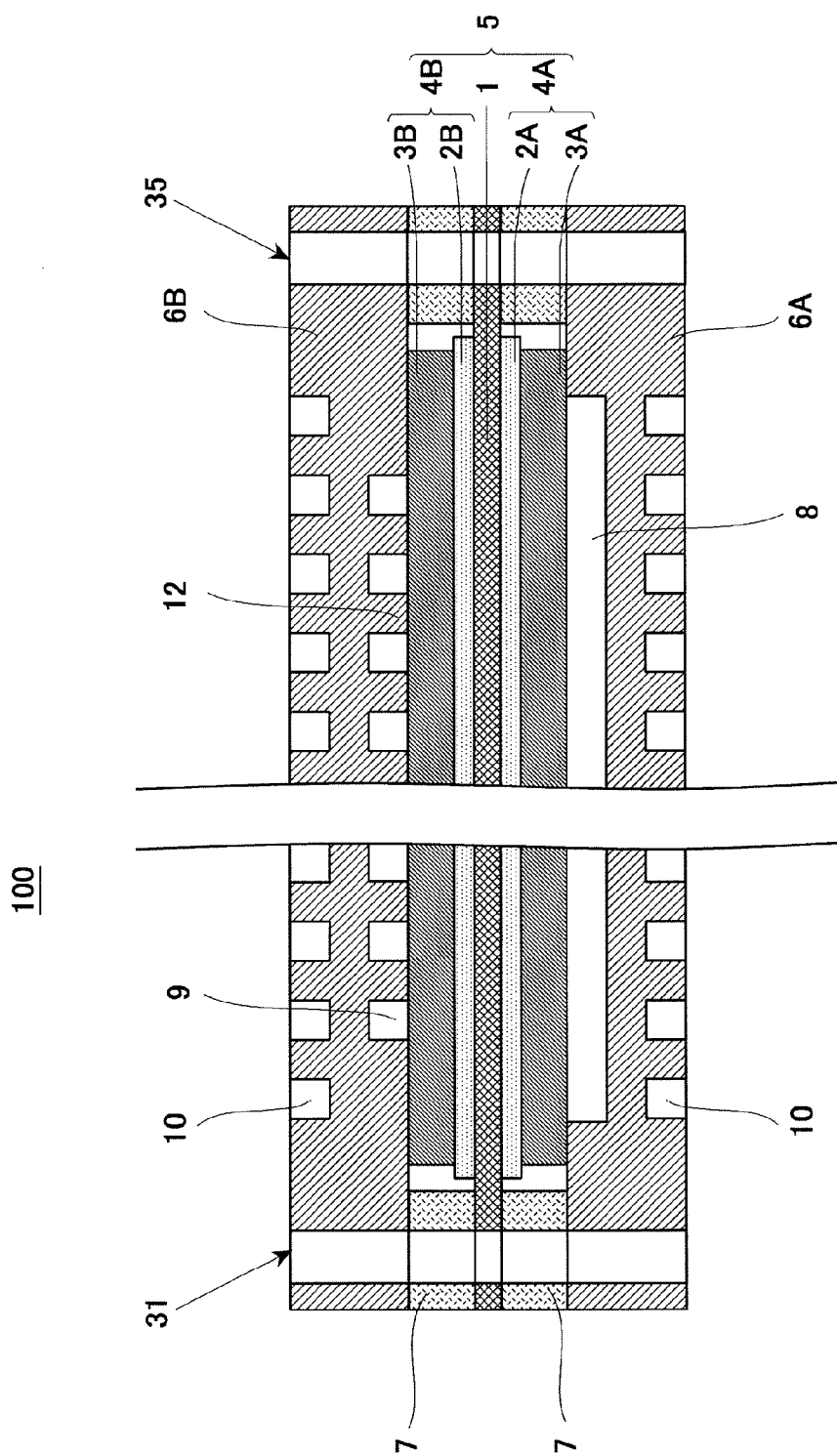
FIG. 9 is a cross-sectional view schematically showing the schematic configuration of the polymer electrolyte fuel cell according to Embodiment 4 of the present invention.

FIG. 8 is a schematic diagram showing the schematic configuration of the separator in the fuel cell according to Embodiment 4 of the present invention. FIG. 9 is a cross-sectional view schematically showing the schematic configuration of the fuel cell according to Embodiment 4 of the present invention. In FIG. 8, the upper-lower direction of the separator is shown as the upper-lower direction of the drawing, and the peripheral portion of the electrode is shown by hatching.

As shown in FIGS. 8 and 9, the fuel cell 100 according to Embodiment 4 of the present invention is the same in basic configuration as the fuel cell 100 according to Embodiment 1 but is different from the fuel cell 100 according to Embodiment 1 in that the second oxidizing gas channels 92 of the oxidizing gas channels 9 are not formed in the fuel cell 100 according to Embodiment 4. To be specific, in the separator according to Embodiment 4, each of the plurality of oxidizing gas channels 9 includes an upstream channel 90a, a downstream channel 90b, and a midstream channel 90c that is a portion other than the upstream channel 90a and the downstream channel 90b. The upstream channel 90a includes the portion 91A which first contacts the peripheral portion 40B of the cathode electrode 4B when viewed from the thickness direction of the separator and tracing the oxidizing gas channel 9 from the upstream end to the downstream side. The downstream channel 90b includes the portion 91B which first contacts the peripheral portion 40B of the cathode electrode 4B when viewed from the thickness direction of the separator and tracing the oxidizing gas channel 9 from the downstream end to the upstream side. The midstream channel 90c is formed so as not to overlap the peripheral portion 40B of the cathode electrode 4B. Here, the upstream channel 90a is a portion between one end that is the upstream end of the oxidizing gas channel 9, that is, a portion overlapping the cathode electrode 4B when viewed from the thickness direction of the cathode separator 6B and the other end that is a portion satisfying a formula "$L1 \leq \{(1/3) \times L2\}$". In this formula, L1 denotes the length of the upstream channel 90a of the oxidizing gas channel 9, and L2 denotes the entire length of the oxidizing gas channel 9. The downstream channel 90b is a portion between one end that is the downstream end of the oxidizing gas channel 9, that is, a portion overlapping the cathode electrode 4B when viewed from the thickness direction of the cathode separator 6B and the other end that is a portion satisfying a formula "$L3 \leq \{(1/3) \times L2\}$". In this formula, L3 denotes the length of the downstream channel 90b of the oxidizing gas channel 9.

As above, in the fuel cell 100 according to Embodiment 4, the second oxidizing gas channel 92 is not formed on each of portions of the peripheral portion 40B of the cathode electrode 4B, the portions being respectively located on the first side portion side and the second side portion side. Therefore, the oxidizing gas is not supplied to these portions of the peripheral portion 40B. On this account, the amount of gas leaked by cross leakage can be reduced at portions of the polymer electrolyte membrane 1, the portions facing the above portions of the peripheral portion 40B when viewed from the thickness direction of the cathode separator 6B. Thus, the generation of the radicals from hydrogen peroxide is further reduced. Therefore, in the fuel cell 100 according to Embodiment 4, the durability of the polymer electrolyte membrane 1 can be improved, and the decrease in the cell performance can be suppressed.

Embodiment 5

Figure 10:
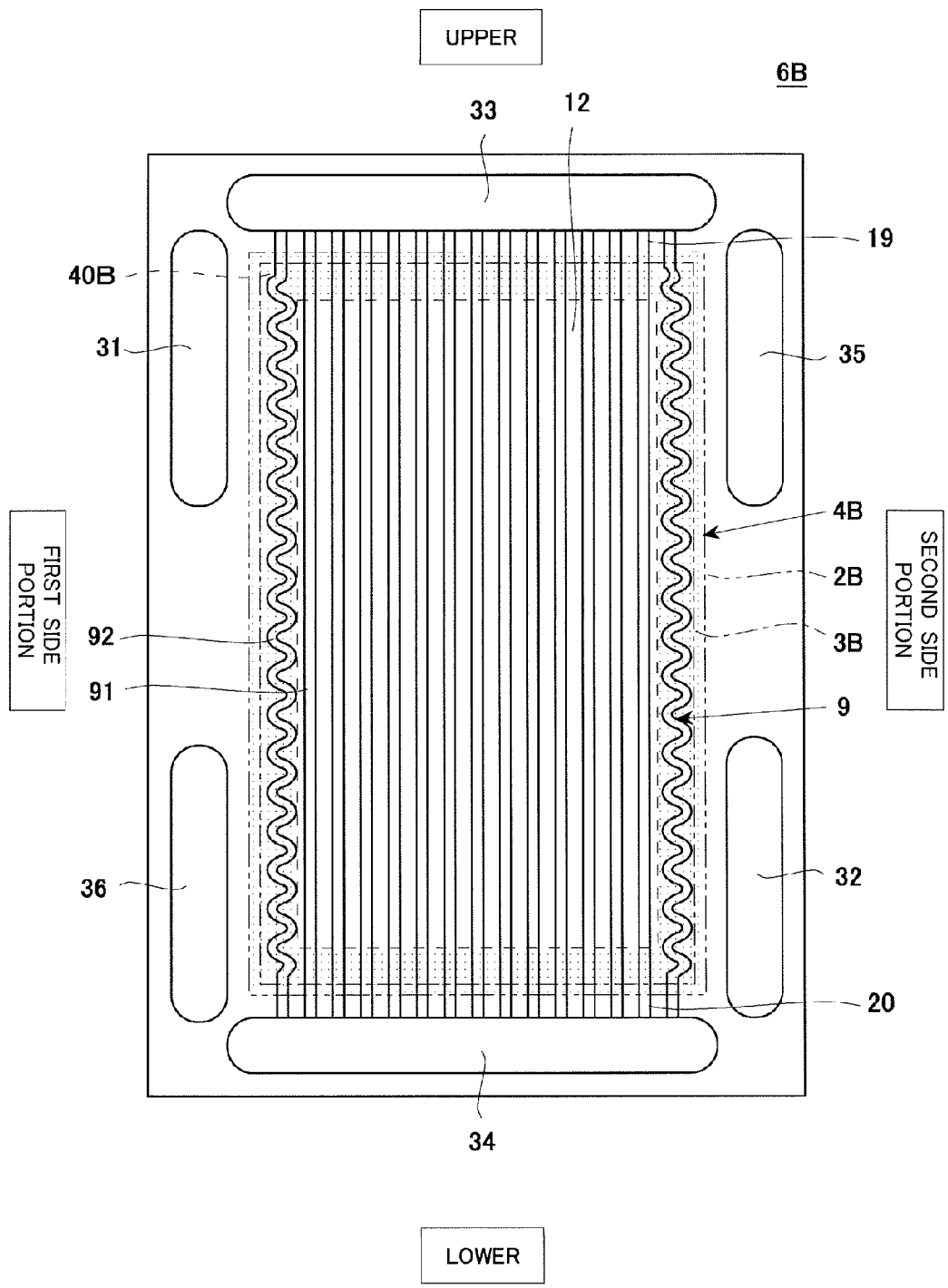
FIG. 10 is a schematic diagram showing the schematic configuration of the separator according to Embodiment 5 of the present invention.

FIG. 10 is a schematic diagram showing the schematic configuration of the separator of the fuel cell according to Embodiment 5 of the present invention. In FIG. 10, the upper-lower direction of the separator is shown as the upper-lower direction of the drawing, and the peripheral portion of the electrode is shown by hatching.

As shown in FIG. 10, the separator (herein, cathode separator 6B) of the fuel cell 100 according to Embodiment 5 of the present invention is the same in basic configuration as the separator (herein, cathode separator 6B) of the fuel cell 100 according to Embodiment 1 but is different from the separator (herein, cathode separator 6B) of the fuel cell 100 according to Embodiment 1 regarding the configuration of the second oxidizing gas channel 92. Specifically, the second oxidizing gas channel 92 is formed such that the cross-sectional area thereof is the same as that of the first oxidizing gas channel 91 but the length thereof is longer than that of the first oxidizing gas channel 91. In Embodiment 5, the second oxidizing gas channel 92 is formed to have a serpentine shape when viewed from the thickness direction of the cathode separator 6B.

With this, the flow rate of the oxidizing gas flowing through the second oxidizing gas channel 92 can be made lower than that of the oxidizing gas flowing through the first oxidizing gas channel 91. On this account, the fuel cell 100 according to Embodiment 5 has the same operational advantages as the fuel cell 100 according to Embodiment 1.

Embodiment 6

Figure 11:
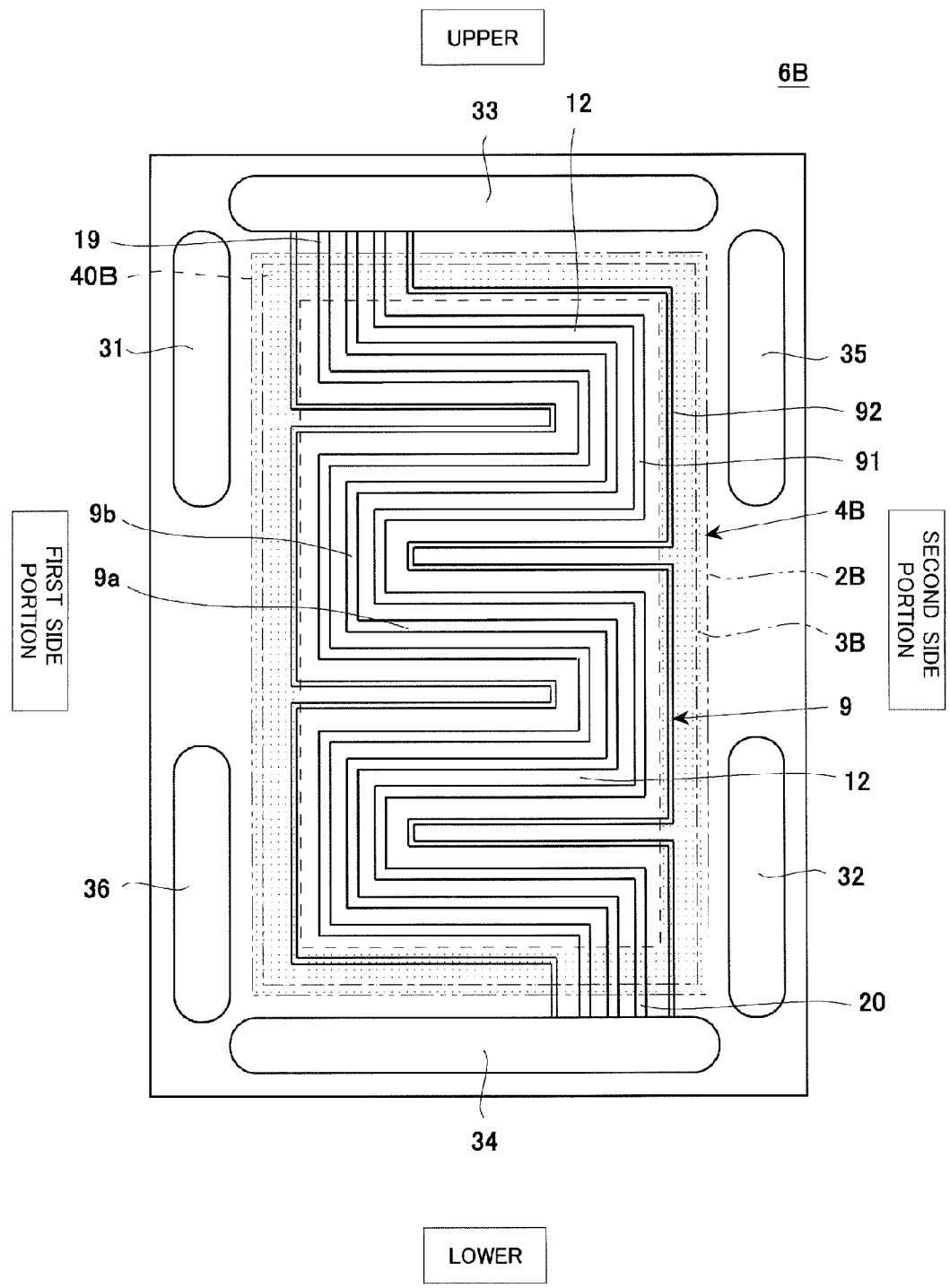
FIG. 11 is a schematic diagram showing the schematic configuration of the separator according to Embodiment 6 of the present invention.

FIG. 11 is a schematic diagram showing the schematic configuration of the separator in the fuel cell according to Embodiment 6 of the present invention. In FIG. 11, the upper-lower direction of the separator is shown as the upper-lower direction of the drawing, and the peripheral portion of the electrode is shown by hatching.

As shown in FIG. 11, the separator (herein, cathode separator 6B) of the fuel cell 100 according to Embodiment 6 of the present invention is the same in basic configuration as the separator (herein, cathode separator 6B) of the fuel cell 100 according to Embodiment 1 but is different from the separator (herein, cathode separator 6B) of the fuel cell 100 according to Embodiment 1 in that the plurality of oxidizing gas channels 9 are formed to have a serpentine shape. Specifically, the plurality of oxidizing gas channels 9 are formed in the same manner as the fuel gas channels 8 of the fuel cell 100 according to Embodiment 1 and are practically constituted by straight portions 9a and turn portions 9b.

The plurality of oxidizing gas channels 9 includes the first oxidizing gas channels 91 and the second oxidizing gas channels 92. The second oxidizing gas channel 92 is formed such that the cross-sectional area thereof is smaller than that of the first oxidizing gas channel 91 (herein, the width thereof is smaller than that of the first oxidizing gas channel 91).

In Embodiment 6, the second oxidizing gas channel 92 is formed such that the cross-sectional area of the entire second oxidizing gas channel 92 is smaller than that of the first oxidizing gas channel 91. However, the present embodiment is not limited to this. The second oxidizing gas channel 92 may be formed such that the cross-sectional area of a portion of the second oxidizing gas channel 92, the portion overlapping the peripheral portion 40B of the cathode electrode 4B, is smaller than that of the first oxidizing gas channel 91, and the cross-sectional area of the other portion thereof is the same as that of the first oxidizing gas channel 91 when viewed from the thickness direction of the cathode separator 6B.

Moreover, in Embodiment 6, the second oxidizing gas channel 92 is formed such that the width thereof is smaller than that of the first oxidizing gas channel 91. However, the present embodiment is not limited to this. For example, as with Embodiment 3, the second oxidizing gas channel 92 may be formed such that the depth thereof is smaller than that of the first oxidizing gas channel 91.

Further, in Embodiment 6, each of the first oxidizing gas channel 91 and the second oxidizing gas channel 92 is formed to have a serpentine shape. However, the shape of each of the first oxidizing gas channel 91 and the second oxidizing gas channel 92 is not limited as long as the flow rate of the oxidizing gas flowing through the second oxidizing gas channel 92 can be made lower than that of the oxidizing gas flowing through the first oxidizing gas channel 91. For example, the first oxidizing gas channel 91 may be formed to have a straight shape, and the second oxidizing gas channel 92 may be formed to have a serpentine shape. Moreover, for example, the straight portion 9a and/or turn portion 9b of the second oxidizing gas channel 92 may be formed to have a further serpentine shape as with the second oxidizing gas channel 92 of Embodiment 5, and the length of the second oxidizing gas channel 92 may be longer than that of the first oxidizing gas channel 91.

The fuel cell 100 according to Embodiment 6 configured as above has the same operational advantages as the fuel cell 100 according to Embodiment 1.

Embodiment 7

Figure 12:
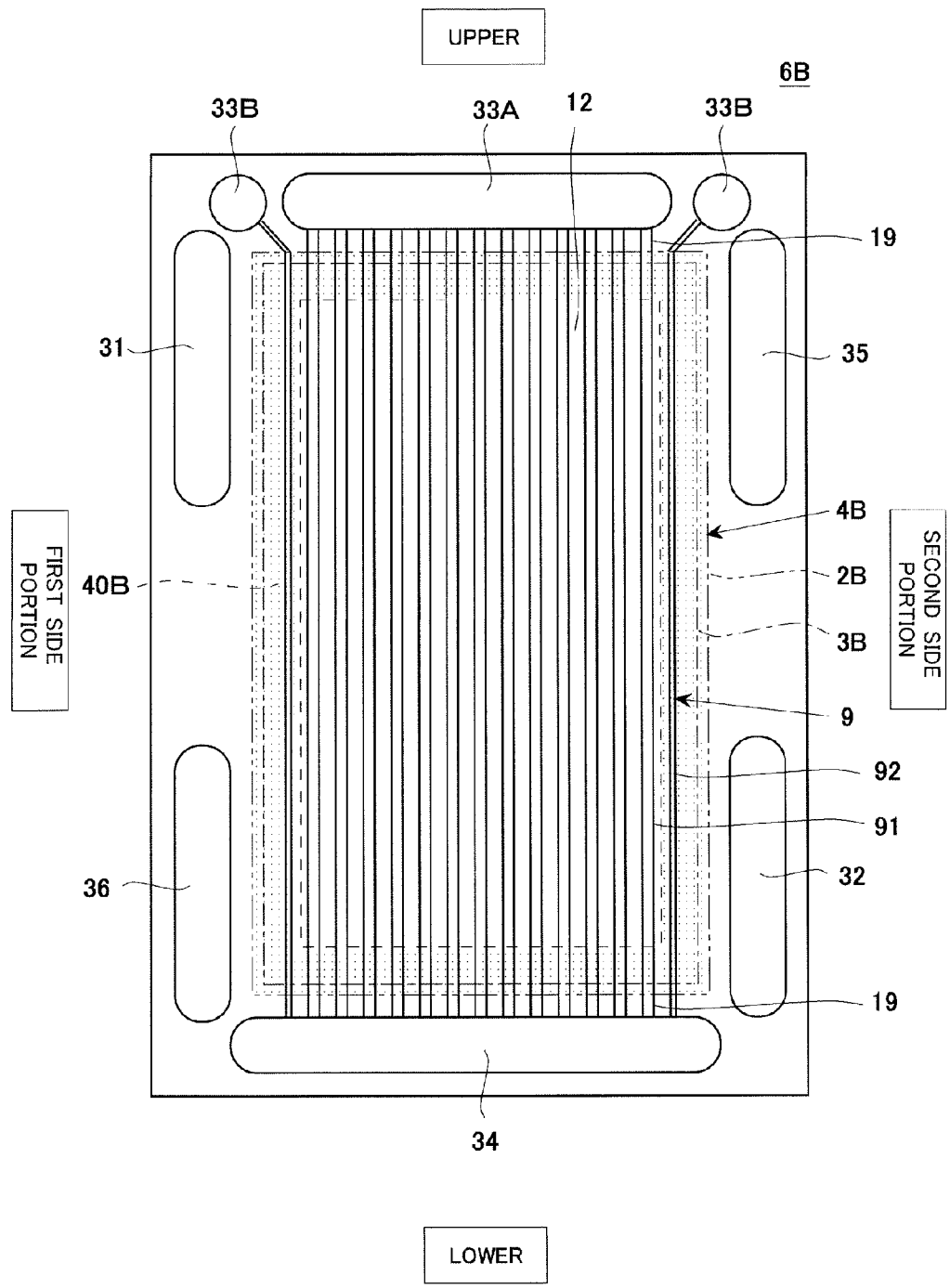
FIG. 12 is a schematic diagram showing the schematic configuration of the separator according to Embodiment 7 of the present invention.

FIG. 12 is a schematic diagram showing the schematic configuration of the separator of the fuel cell according to Embodiment 7 of the present invention. In FIG. 12, the upper-lower direction of the separator is shown as the upper-lower direction of the drawing, and the peripheral portion of the electrode is shown by hatching.

As shown in FIG. 12, the separator (herein, cathode separator 6B) of the fuel cell 100 according to Embodiment 7 of the present invention is the same in basic configuration as the separator (herein, cathode separator 6B) of the fuel cell 100 according to Embodiment 1 but is different from the separator (herein, cathode separator 6B) of the fuel cell according to Embodiment 1 in that a manifold (hole) through which the oxidizing gas is supplied to the first oxidizing gas channel 91 and a manifold (hole) through which the oxidizing gas is supplied to the second oxidizing gas channel 92 are provided. Specifically, a first oxidizing gas supply manifold hole 33A is formed on an upper portion of the cathode separator 6B, and second oxidizing gas supply manifold holes 33B are respectively formed between the first oxidizing gas supply manifold hole 33A and the fuel gas supply manifold hole 31 and between the first oxidizing gas supply manifold hole 33A and the cooling medium supply manifold hole 35.

The upstream end of the first oxidizing gas channel 91 is connected to the first oxidizing gas supply manifold hole 33A, and the downstream end thereof is connected to the oxidizing gas discharge manifold hole 34. The upstream end of the second oxidizing gas channel 92 is connected to the second oxidizing gas supply manifold hole 33B, and the downstream end thereof is connected to the oxidizing gas discharge manifold hole 34.

In this case, in order that the flow rate of the oxidizing gas flowing through the second oxidizing gas channel 92 is made lower than that of the oxidizing gas flowing through the first oxidizing gas channel 91, it is preferable that the pressure of the oxidizing gas supplied to the second oxidizing gas channel 92 be equal to or lower than that of the oxidizing gas supplied to the first oxidizing gas channel 91.

To be specific, it is preferable that the pressure in the second oxidizing gas supply manifold hole 33B (second oxidizing gas supply manifold formed by connecting the second oxidizing gas supply manifold holes 33B) be equal to or lower than that in the first oxidizing gas supply manifold hole 33A (first oxidizing gas supply manifold formed by connecting the first oxidizing gas supply manifold holes 33A).

In other words, it is preferable that the flow rate of the oxidizing gas (flowing through the second oxidizing gas supply manifold hole 33B) supplied to the second oxidizing gas supply manifold hole 33B be equal to or lower than that of the oxidizing gas (flowing through the first oxidizing gas supply manifold hole 33A) supplied to the first oxidizing gas supply manifold hole 33A.

In Embodiment 7, the second oxidizing gas channel 92 is formed such that the width thereof is smaller than that of the first oxidizing gas channel 91. However, the present embodiment is not limited to this. For example, as with Embodiment 3, the second oxidizing gas channel 92 may be formed such that the depth thereof is smaller than that of the first oxidizing gas channel 91.

Further, in Embodiment 7, the oxidizing gas channel 9 is formed to have a linear shape. However, the present embodiment is not limited to this. For example, as with Embodiment 5, the first oxidizing gas channel 91 may be formed to have a linear shape, and the second oxidizing gas channel 92 may be formed to have a serpentine shape. Moreover, as with Embodiment 6, the oxidizing gas channel 9 (the first oxidizing gas channel 91 and the second oxidizing gas channel 92) may be formed to have a serpentine shape.

The fuel cell 100 according to Embodiment 7 configured as above has the same operational advantages as the fuel cell 100 according to Embodiment 1.

Embodiment 8

Figure 13:
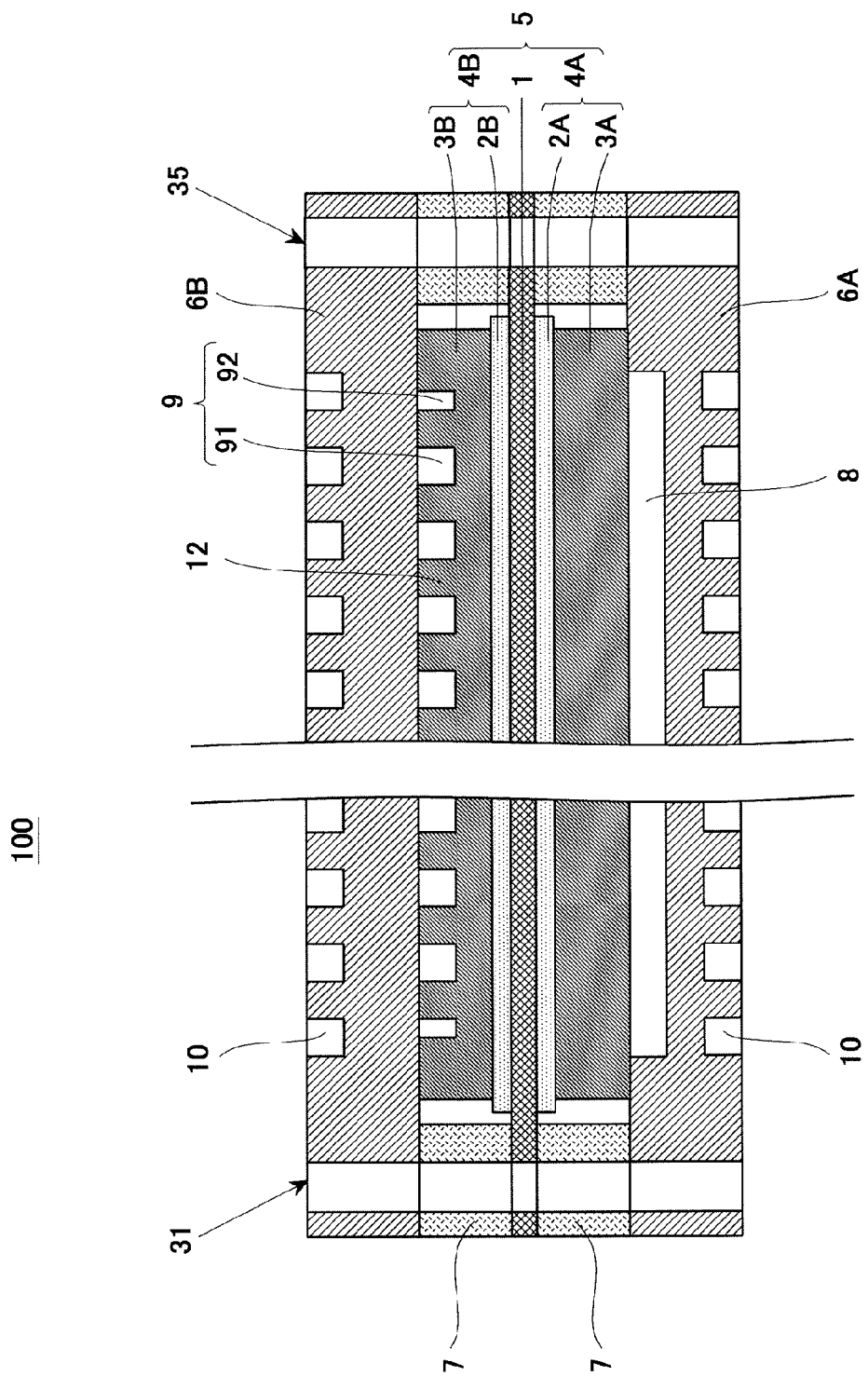
FIG. 13 is a cross-sectional view schematically showing the schematic configuration of a fuel cell according to Embodiment 8 of the present invention.
Figure 14:
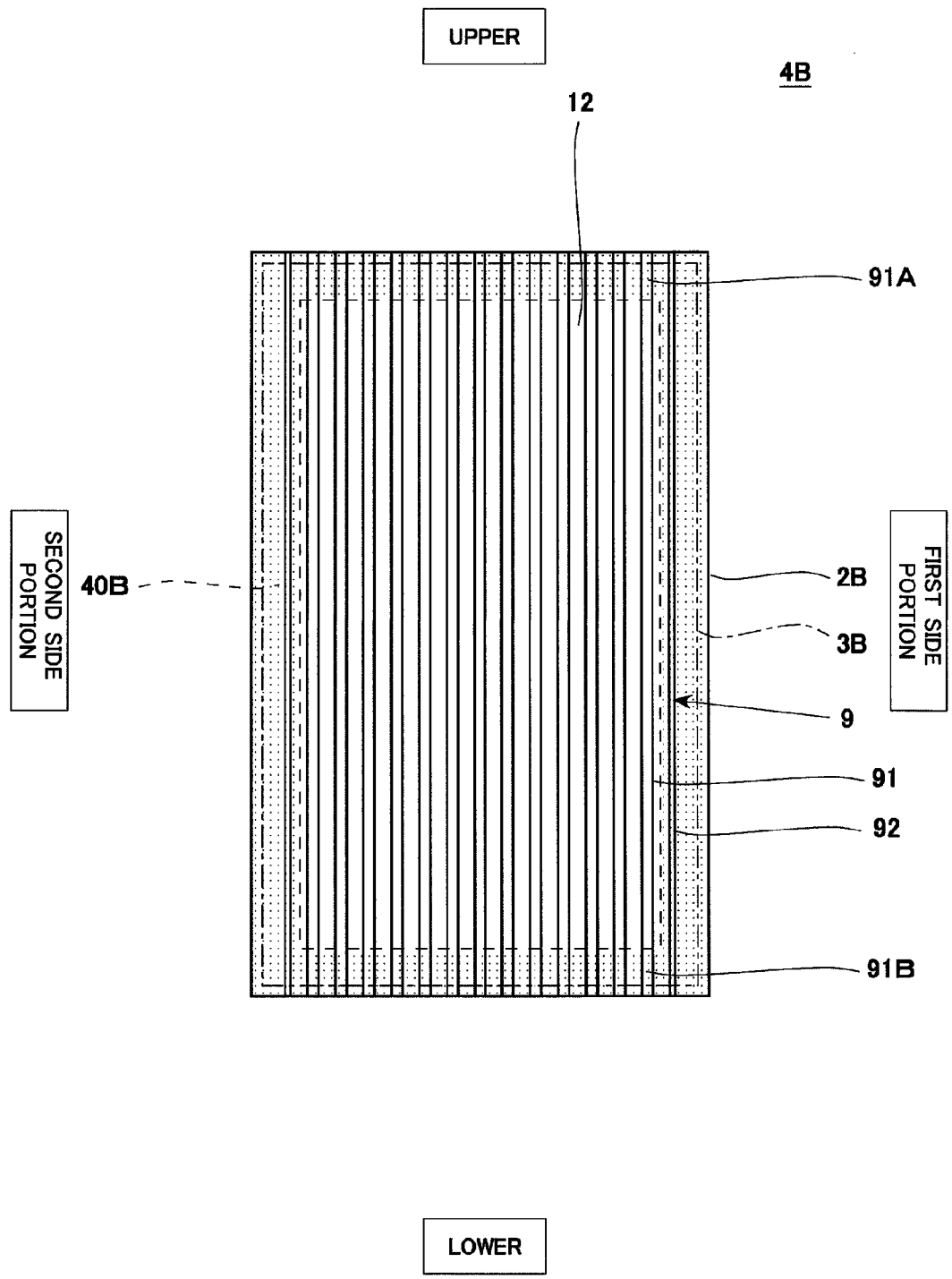
FIG. 14 is a schematic diagram showing the schematic configuration of an electrode in the fuel cell shown in FIG. 13.
Figure 15:
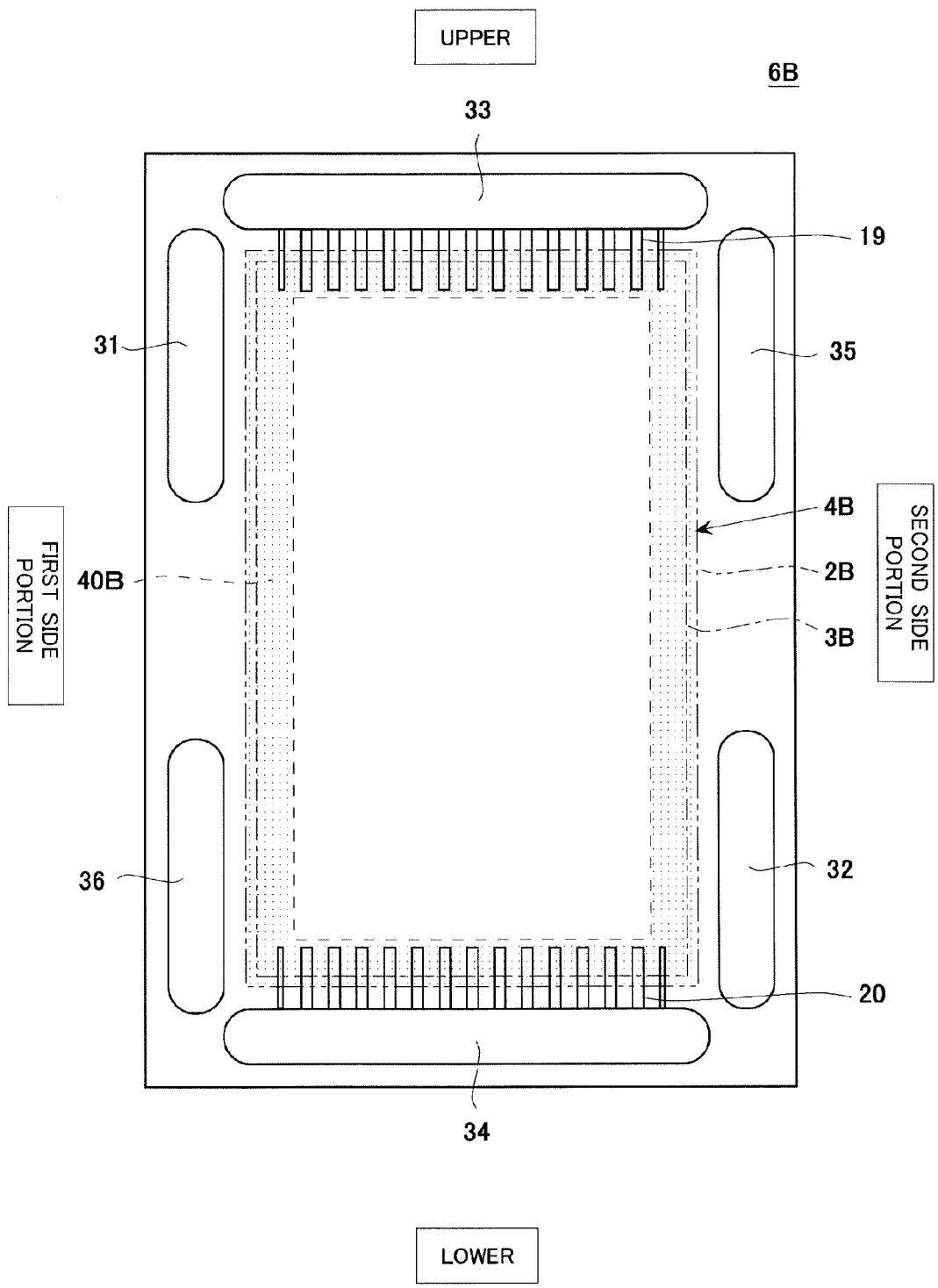
FIG. 15 is a schematic diagram showing the schematic configuration of the separator in the fuel cell shown in FIG. 13.

FIG. 13 is a cross-sectional view schematically showing the schematic configuration of the fuel cell according to Embodiment 8 of the present invention. FIG. 14 is a schematic diagram showing the schematic configuration of the electrode in the fuel cell shown in FIG. 13. FIG. 15 is a schematic diagram showing the schematic configuration of the separator in the fuel cell shown in FIG. 13.

In FIG. 14, the upper-lower direction of the separator is shown as the upper-lower direction of the drawing, and the peripheral portion of the electrode is shown by hatching. In FIG. 15, the upper-lower direction of the electrode is shown as the upper-lower direction of the drawing.

As shown in FIGS. 13 to 15, the fuel cell 100 according to Embodiment 8 of the present invention is the same in basic configuration as the fuel cell 100 according to Embodiment 1 but is different from the fuel cell 100 according to Embodiment 1 in that the oxidizing gas channels 9 are formed on the cathode gas diffusion layer 3B of the cathode electrode 4B. In addition, the fuel cell 100 according to Embodiment 8 is different from the fuel cell 100 according to Embodiment 1 regarding the shapes of the first connection channels 19 and second connection channels 20.

Specifically, the oxidizing gas channels 9 are formed on a main surface (hereinafter referred to as an "outer surface") of the cathode gas diffusion layer 3B, the outer surface contacting the cathode separator 6B. The oxidizing gas channels 9 are formed in a linear shape so as to extend from the upper end to lower end of the cathode gas diffusion layer 3B. A portion between the oxidizing gas channels 9 on the outer surface of the cathode gas diffusion layer 3B constitutes the second rib portion 12.

The cathode gas diffusion layer 3B is constituted by a sheet containing binder resin and electrically-conductive particles without using a resin-impregnated carbon fiber base material used in a gas diffusion layer of a conventional fuel cell. One example of the binder resin is fluorocarbon resin, and one example of the electrically-conductive particle is a particle made of carbon.

Examples of the fluorocarbon resin are PTFE (polytetrafluoroethylene), FEP (tetrafluoroethylene-hexafluoropropylene copolymer), PVDF (polyvinylidene fluoride), ETFE (tetrafluoroethylene-ethylene copolymer), PCTFE (polychlorotrifluoroethylene), and PFA (tetrafluoroethylene-perfluoroalkyl vinyl ether copolymer). In view of heat resistance, water repellency, and chemical resistance, PTFE is preferable. Examples of the form of the material of PTFE are dispersion and powder. The dispersion is preferable in view of usability.

Examples of the carbon material are graphite, carbon black, and activated carbon, and these materials may be used alone, or a plurality of materials may be used in combination. The form of the carbon material may be any form, such as powder, fiber, and particles.

To cause the cathode gas diffusion layer 3B to serve as a binder, it is preferable that the cathode gas diffusion layer 3B contain 5 wt % or more of binder resin. To facilitate conditions at the time of a roll-out process for forming the cathode gas diffusion layer 3B having uniform thickness, it is preferable that the cathode gas diffusion layer 3B contain 50 wt % or less of binder resin. For the same reasons as above, it is more preferable that the cathode gas diffusion layer 3B contain 10 to 30 wt % of binder resin.

In addition to the binder resin and the electrically-conductive particles, the cathode gas diffusion layer 3B may contain a dispersion solvent, a surfactant, and the like. Examples of the dispersion solvent are water, alcohols, such as methanol and ethanol, and glycols, such as ethylene glycol. Examples of the surfactant are nonions, such as polyoxyethylene alkyl ether, and amphoteric ions, such as alkyl amine oxide. Each of the amount of dispersion solvent and the amount of surfactant can be suitably selected depending on the material (carbon material) of the electrically-conductive particles constituting the cathode gas diffusion layer 3B, the type of the binder resin (fluorocarbon resin) constituting the cathode gas diffusion layer 3B, the compounding ratio of the binder resin (fluorocarbon resin) to the electrically-conductive particles (carbon). Generally, as the amount of dispersion solvent and the amount of surfactant increase, the binder resin (fluorocarbon resin) and the electrically-conductive particles (carbon) easily, uniformly disperse. However, since the flowability increases, the formation of the sheet tends to become difficult.

Here, a method of producing the cathode gas diffusion layer 3B will be explained.

The cathode gas diffusion layer 3B is produced by kneading a mixture containing the binder resin and the electrically-conductive particle and performing extruding, roll-out, and firing. Specifically, the carbon that is the electrically-conductive particles, the dispersion solvent, and the surfactant are put in a kneading mixer and are kneaded, crushed, and granulated. Thus, the carbon is dispersed in the dispersion solvent. Next, the fluorocarbon resin that is the binder resin is further put in the kneading mixer and is mixed and kneaded. Thus, the carbon and the fluorocarbon resin are dispersed. The obtained mixture is rolled out to form a sheet, and the sheet is subjected to the firing to remove the dispersion solvent and the surfactant. Thus, the sheet for forming the cathode gas diffusion layer 3B is produced. Then, grooves constituting the oxidizing gas channels 9 are formed on a main surface of the sheet produced as above by a suitable method (for example, molding by using a pressing machine or cutting by using a cutting machine). Thus, the cathode gas diffusion layer 3B is obtained. The surfactant may be selected depending on the material (carbon material) of the electrically-conductive particles and the type of the dispersion solvent. Moreover, the surfactant may not be used.

The porosity of the cathode gas diffusion layer 3B produced as above is lower than that of the resin-impregnated carbon fiber base material used in the gas diffusion layer of the conventional fuel cell but is set such that the reactant gas (oxidizing gas) can adequately move. Therefore, the cathode gas diffusion layer 3B produced by the above producing method adequately serves as the gas diffusion layer.

As shown in FIG. 14, the first connection channel 19 is formed to extend in the upper-lower direction such that the other end thereof is located on a lower side of the upper end of the cathode gas diffusion layer 3B when viewed from the thickness direction of the cathode separator 6B. Similarly, the second connection channel 20 is formed to extend in the upper-lower direction such that the other end thereof is located on an upper side of the lower end of the cathode gas diffusion layer 3B when viewed from the thickness direction of the cathode separator 6B.

With this, when the cathode gas diffusion layer 3B and the cathode separator 6B are stacked on each other, the upstream end of the oxidizing gas channel 9 communicates with the first connection channel 19, and the downstream end of the oxidizing gas channel 9 communicates with the second connection channel 20. On this account, the oxidizing gas is supplied from the oxidizing gas supply manifold hole 33 through the first connection channel 19 to the oxidizing gas channel 9. The oxidizing gas having flowed through the oxidizing gas channel 9 is discharged through the second connection channel 20 to the oxidizing gas discharge manifold hole 34.

The fuel cell 100 according to Embodiment 8 configured as above has the same operational advantages as the fuel cell 100 according to Embodiment 1.

Modification Example 1

Next, a modification example of the fuel cell 100 according to Embodiment 8 will be explained.

Figure 16:
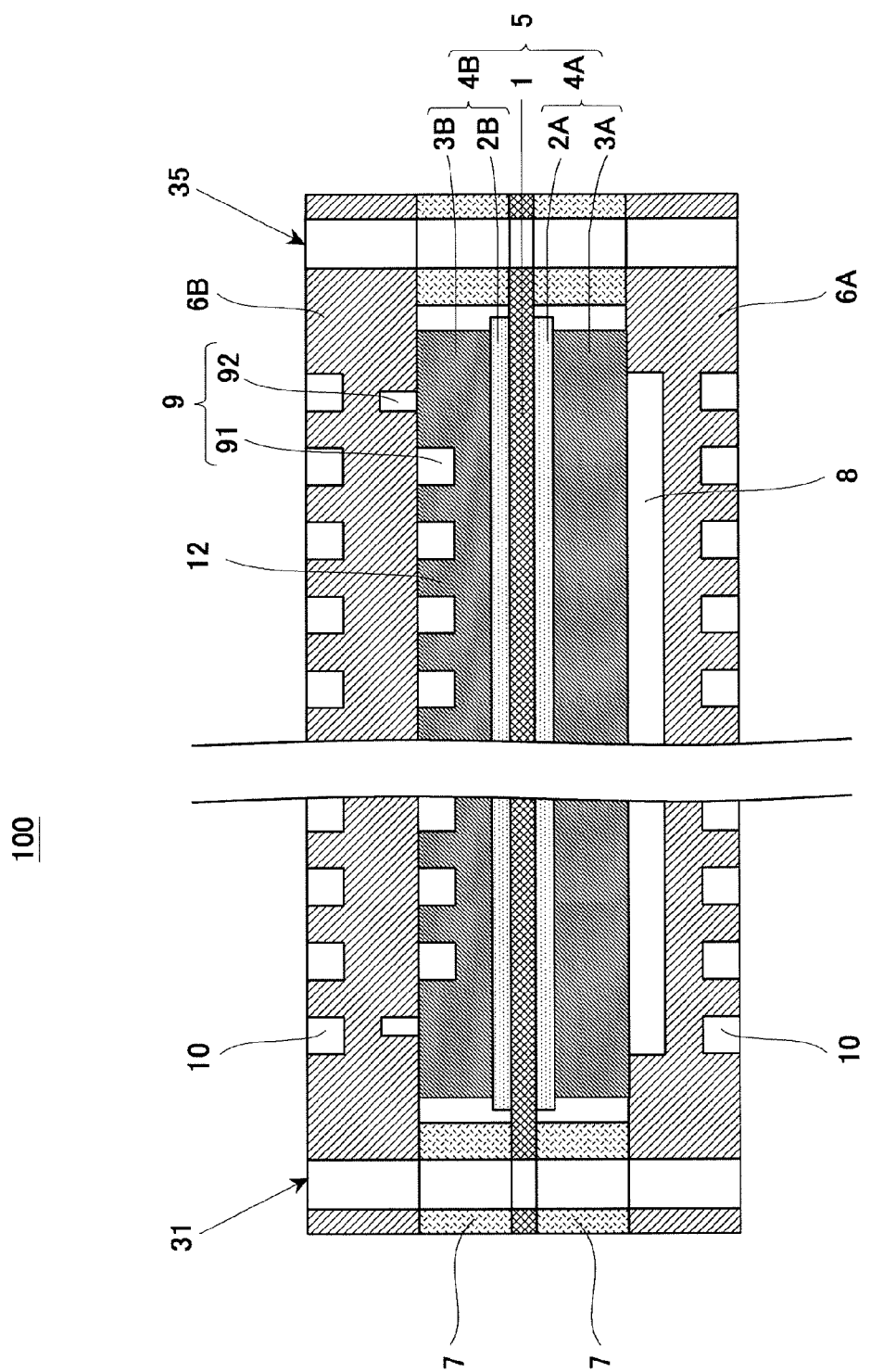
FIG. 16 is a cross-sectional view schematically showing the schematic configuration of the fuel cell of Modification Example 1 of Embodiment 8.

FIG. 16 is a cross-sectional view schematically showing the schematic configuration of the fuel cell of Modification Example 1 of Embodiment 8.

As shown in FIG. 16, the fuel cell 100 of Modification Example 1 is the same in basic configuration as the fuel cell 100 according to Embodiment 8 but is different from the fuel cell 100 according to Embodiment 8 in that the second oxidizing gas channels 92 are formed on the cathode separator 6B.

The fuel cell 100 of Modification Example 1 configured as above has the same operational advantages as the fuel cell 100 according to Embodiment 8.

Modification Example 2

Figure 17:
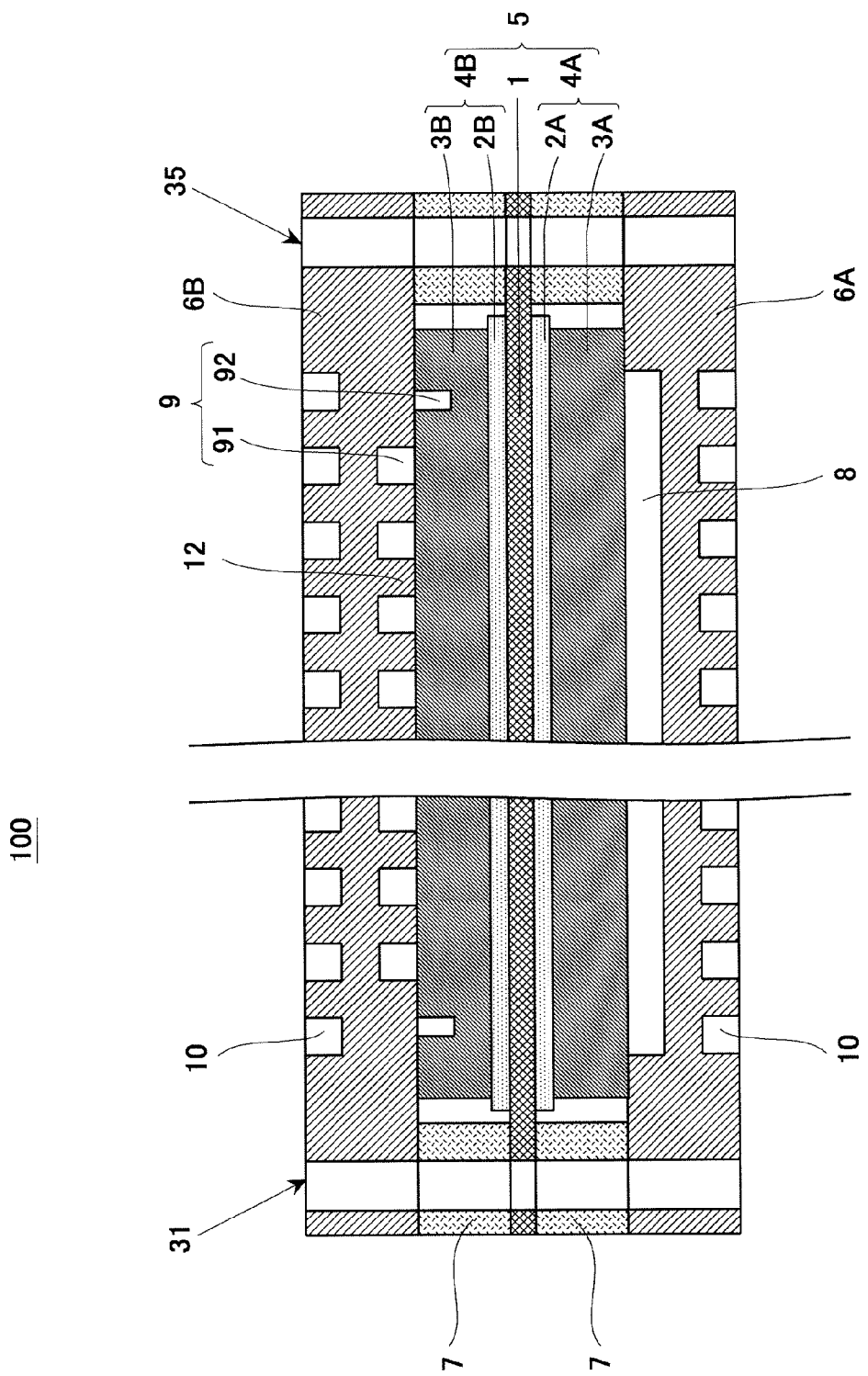
FIG. 17 is a cross-sectional view schematically showing the schematic configuration of the fuel cell of Modification Example 2 of Embodiment 8.

FIG. 17 is a cross-sectional view schematically showing the schematic configuration of the fuel cell of Modification Example 2 of Embodiment 8.

As shown in FIG. 17, the fuel cell 100 of Modification Example 2 is the same in basic configuration as the fuel cell 100 according to Embodiment 8 but is different from the fuel cell 100 according to Embodiment 8 in that the first oxidizing gas channels 91 are formed on the cathode separator 6B.

The fuel cell 100 of Modification Example 2 configured as above has the same operational advantages as the fuel cell 100 according to Embodiment 8.

Embodiment 9

Figure 18:
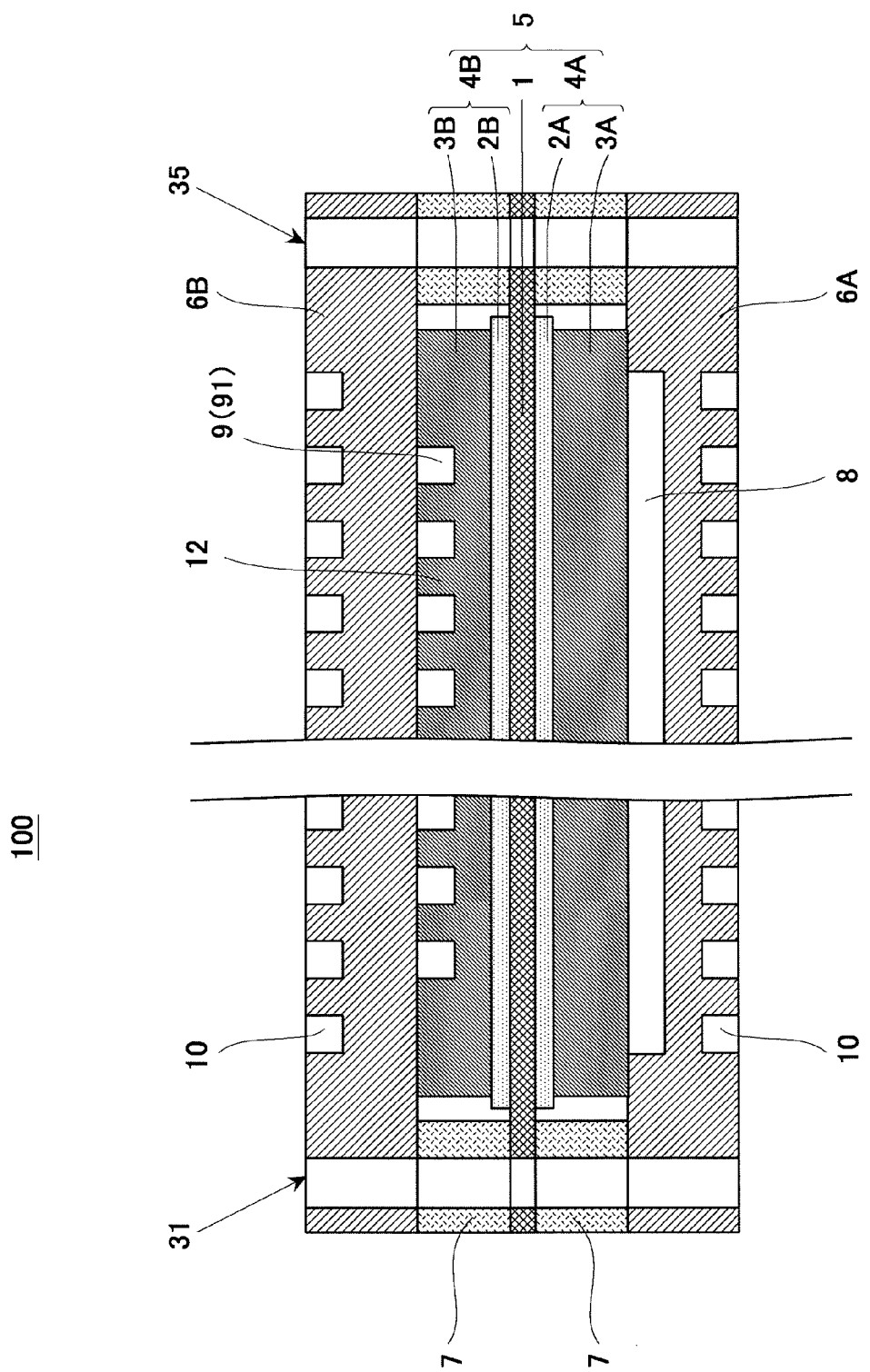
FIG. 18 is a cross-sectional view schematically showing the schematic configuration of the fuel cell according to Embodiment 9 of the present invention.
Figure 19:
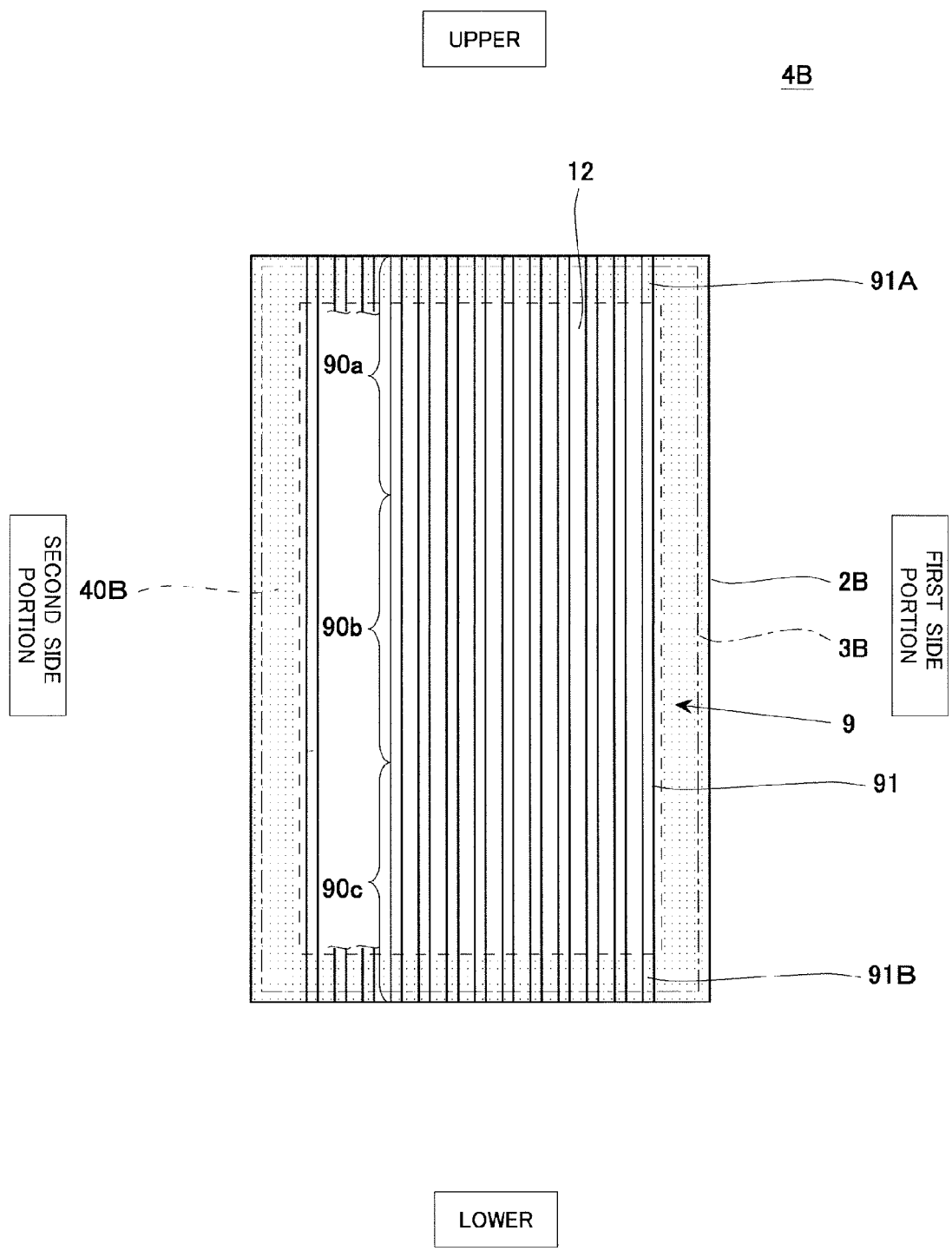
FIG. 19 is a schematic diagram showing the schematic configuration of the electrode in the fuel cell according to Embodiment 9 of the present invention.

FIG. 18 is a cross-sectional view schematically showing the schematic configuration of the fuel cell according to Embodiment 9 of the present invention. FIG. 19 is a schematic diagram showing the schematic configuration of the electrode in the fuel cell according to Embodiment 9 of the present invention. In FIG. 19, the upper-lower direction of the electrode is shown as the upper-lower direction of the drawing, and the peripheral portion of the electrode is shown by hatching.

As shown in FIGS. 18 and 19, the fuel cell 100 according to Embodiment 9 of the present invention is the same in basic configuration as the fuel cell 100 according to Embodiment 8 but is different from the fuel cell 100 according to Embodiment 8 in that the second oxidizing gas channels 92 of the oxidizing gas channels 9 are not formed in the fuel cell 100 according to Embodiment 4. To be specific, in the separator according to Embodiment 9, each of the plurality of oxidizing gas channels 9 includes an upstream channel 90a, a downstream channel 90b, and a midstream channel 90c that is a portion other than the upstream channel 90a and the downstream channel 90b. The upstream channel 90a includes the portion 91A which first contacts the peripheral portion 40B of the cathode electrode 4B when viewed from the thickness direction of the separator and tracing the oxidizing gas channel 9 from the upstream end to the downstream side. The downstream channel 90b includes the portion 91B which first contacts the peripheral portion 40B of the cathode electrode 4B when viewed from the thickness direction of the separator and tracing the oxidizing gas channel 9 from the downstream end to the upstream side. The midstream channel 90c is formed so as not to overlap the peripheral portion 40B of the cathode electrode 4B.

As above, in the fuel cell 100 according to Embodiment 9, the second oxidizing gas channel 92 is not formed on each of portions of the peripheral portion 40B of the cathode electrode 4B, the portions being respectively located on the first side portion side and the second side portion side. Therefore, the oxidizing gas is not supplied to these portions of the peripheral portion 40B. On this account, the amount of gas leaked by cross leakage can be reduced at portions of the polymer electrolyte membrane 1, the portions facing the above portions of the peripheral portion 40B when viewed from the thickness direction of the cathode separator 6B. Thus, the generation of the radicals from hydrogen peroxide is further reduced. Therefore, in the fuel cell 100 according to Embodiment 9, the durability of the polymer electrolyte membrane 1 can be improved, and the decrease in the cell performance can be suppressed.

Embodiment 10

Figure 20:
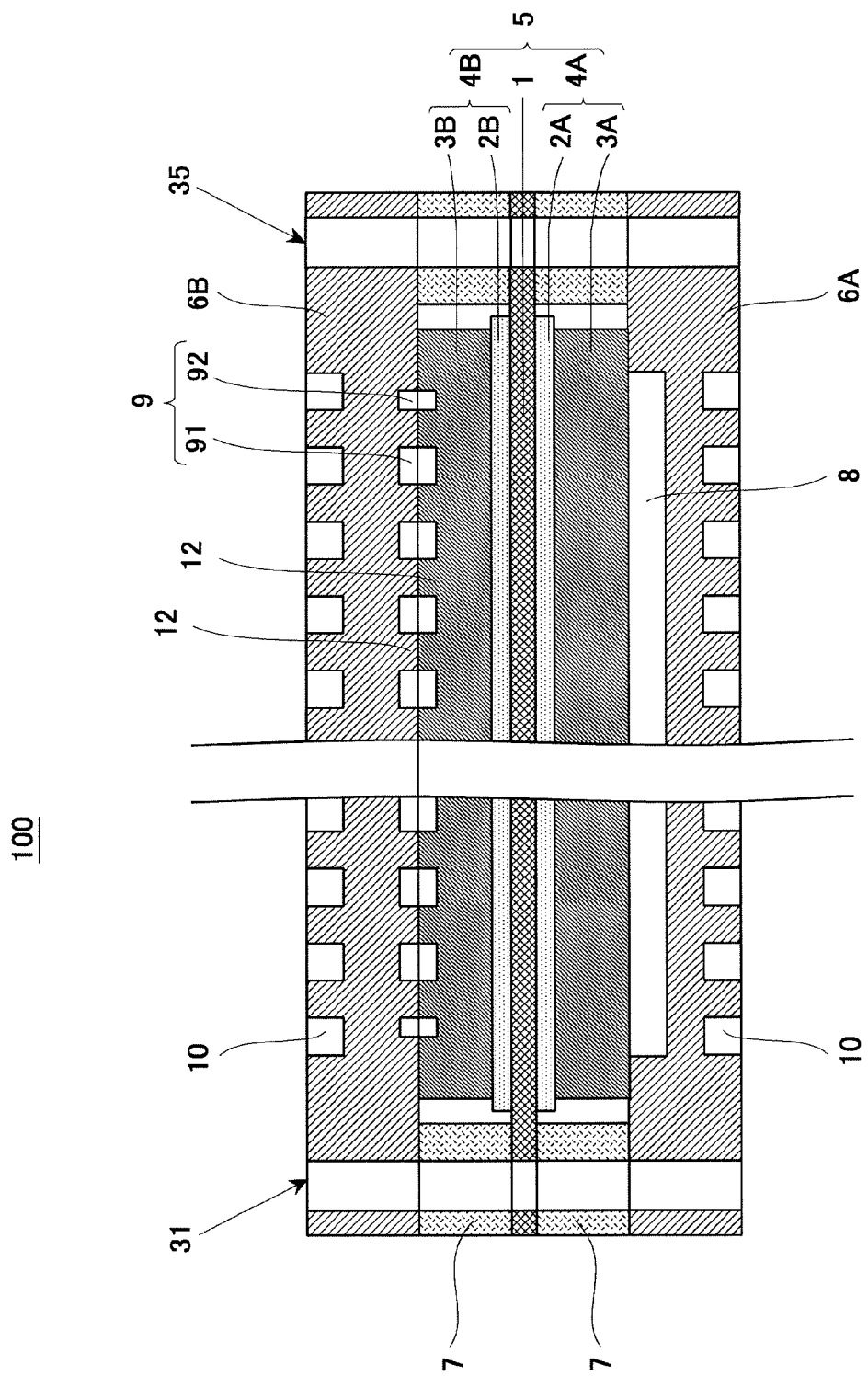
FIG. 20 is a cross-sectional view schematically showing the schematic configuration of the fuel cell according to Embodiment 10 of the present invention.
Figure 21:
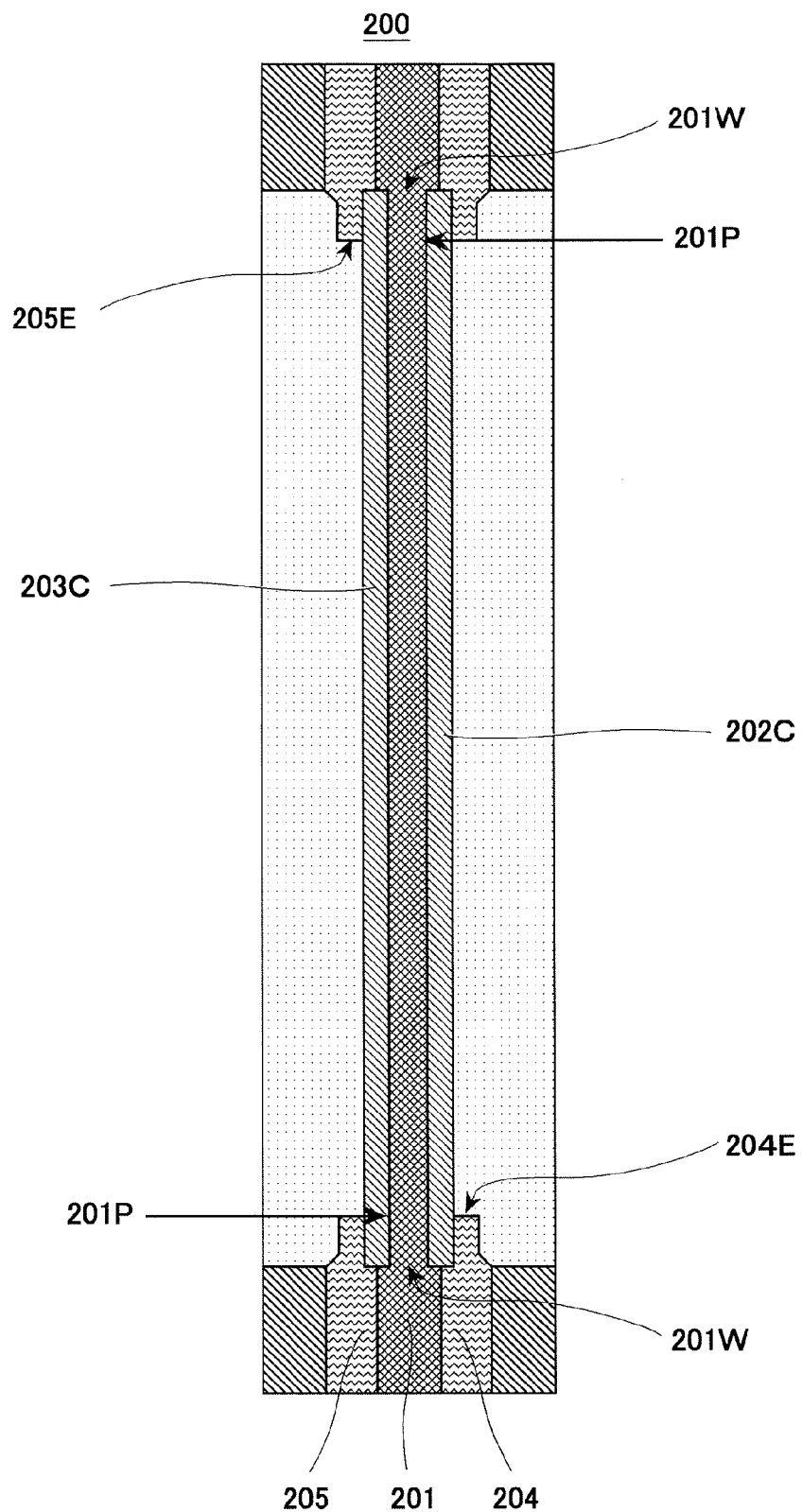
FIG. 21 is a schematic diagram showing the schematic configuration of the cell of the polymer electrolyte fuel cell disclosed in PTL 1.

FIG. 20 is a cross-sectional view schematically showing the schematic configuration of the fuel cell according to Embodiment 10 of the present invention.

As shown in FIG. 20, the fuel cell 100 according to Embodiment 10 of the present invention is the same in basic configuration as the fuel cell 100 according to Embodiment 1 but is different from the fuel cell 100 according to Embodiment 1 in that the oxidizing gas channels 9 are formed on both the cathode gas diffusion layer 3B and the cathode separator 6B. Specifically, the oxidizing gas channels 9 (hereinafter referred to as "GDL-side oxidizing gas channels 9") formed on the cathode gas diffusion layer 3B and the oxidizing gas channels 9 (hereinafter referred to as "separator-side oxidizing gas channels 9") formed on the cathode separator 6B are formed so as to overlap each other when viewed from the thickness direction of the cathode separator 6B.

The fuel cell 100 according to Embodiment 10 configured as above has the same operational advantages as the fuel cell 100 according to Embodiment 1.

In Embodiment 10, the GDL-side oxidizing gas channels 9 and the separator-side oxidizing gas channels 9 are formed so as to overlap each other when viewed from the thickness direction of the cathode separator 6B. However, the present embodiment is not limited to this. As long as the GDL-side oxidizing gas channels 9 and the separator-side oxidizing gas channels 9 are formed such that the oxidizing gas flows therethrough, the GDL-side oxidizing gas channels 9 and the separator-side oxidizing gas channels 9 may be formed such that there is a portion where the GDL-side oxidizing gas channels 9 and the separator-side oxidizing gas channels 9 do not overlap each other when viewed from the thickness direction of the cathode separator 6B.

In Embodiment 10, the second oxidizing gas channels 92 are formed on both the cathode gas diffusion layer 3B and the cathode separator 6B. However, the present embodiment is not limited to this. For example, the second oxidizing gas channels 92 may be formed only on the cathode gas diffusion layer 3B. In contrast, the second oxidizing gas channels 92 may be formed only on the cathode separator 6B. Further, the second oxidizing gas channels 92 may not be formed on the cathode gas diffusion layer 3B and the cathode separator 6B.

In Embodiments 1 to 10 (including Modification Examples), only the cathode separator 6B is used as the separator according to the present invention. However, Embodiments 1 to 10 are not limited to this. Only the anode separator 6A may be used as the separator according to the present invention, or both the anode separator 6A and the cathode separator 6B may be used as the separators of the present invention.

As long as the operational advantages of the present invention can be obtained, the cross-sectional area of a part of the second reactant gas channel (second oxidizing gas channel 92) may be formed to be larger than that of the first reactant gas channel (first oxidizing gas channel 91).

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. In addition, various inventions can be made by suitable combinations of a plurality of components disclosed in the above embodiments.

INDUSTRIAL APPLICABILITY

The polymer electrolyte fuel cell of the present invention can suppress the deterioration of the polymer electrolyte membrane to improve the durability and can suppress the decrease in the performance of the fuel cell. Therefore, the polymer electrolyte fuel cell of the present invention is useful in the field of fuel cells.

REFERENCE SIGNS LIST 1 polymer electrolyte membrane
2A anode catalyst layer
2B cathode catalyst layer
3A anode gas diffusion layer
3B cathode gas diffusion layer
4A anode electrode
4B cathode electrode
5 MEA (Membrane-Electrode Assembly)
6A anode separator
6B cathode separator
7 gasket
8 fuel gas channel
8a straight portion
8b turn portion
9 oxidizing gas channel
9a straight portion
9b turn portion
10 cooling medium channel
11 first rib portion
12 second rib portion
13 reinforcing member
19 first connection channel
20 second connection channel
31 fuel gas supply manifold hole
32 fuel gas discharge manifold hole
33 oxidizing gas supply manifold hole
33A first oxidizing gas supply manifold hole
33B second oxidizing gas supply manifold hole
34 oxidizing gas discharge manifold hole
35 cooling medium supply manifold hole
36 cooling medium discharge manifold hole
40B peripheral portion
61 fuel cell stack
62 cell stack body
63 first end plate
64 second end plate
91 first oxidizing gas channel
91 portion 91A
91 portion 91B
92 second oxidizing gas channel
100 fuel cell
131 fuel gas supply manifold
132 fuel gas discharge manifold
133 oxidizing gas supply manifold
134 oxidizing gas discharge manifold
135 cooling medium supply manifold
136 cooling medium discharge manifold
200 cell
201 polymer membrane
201P portion
201W oxygen electrode boundary membrane portion, fuel electrode boundary membrane portion
202C oxygen electrode catalyst layer
203C fuel electrode catalyst layer
204 reinforcing member
204E inner end portion
205 reinforcing member
205E inner end portion

The invention claimed is:

1. A polymer electrolyte fuel cell comprising:
a membrane-electrode assembly including a polymer electrolyte membrane and a pair of electrodes sandwiching the polymer electrolyte membrane; and
separators each formed in a plate shape and having electrical conductivity, wherein:
each of the electrodes includes a gas diffusion layer and a catalyst layer having one main surface contacting the polymer electrolyte membrane and is formed such that an outer periphery thereof is located on an inner side of an outer periphery of the polymer electrolyte membrane when viewed from a thickness direction of the separator;
the membrane-electrode assembly is sandwiched between a pair of the separators;
a reactant gas supply manifold hole and a reactant gas discharge manifold hole are formed on main surfaces of each of the separators so as to penetrate the separator in the thickness direction, and a plurality of groove-like first connection channels connected to the reactant gas supply manifold hole and a plurality of groove-like second connection channels connected to the reactant gas discharge manifold hole are formed on one main surface of each of the separators, the main surface contacting the electrode;
a plurality of groove-like reactant gas channels each having one end communicating with the first connection channel and the other end communicating with the second connection channel are formed on a main surface of at least one of the separator and the gas diffusion layer, wherein:

the plurality of reactant gas channels include a first reactant gas channel and a second reactant gas channel, the first reactant gas channel is a reactant gas channel which overlaps peripheral portion of the electrode only twice and has a length of a portion overlapping the peripheral portion being equal to or shorter than a predetermined length, when viewed from the thickness direction of the separator and tracing the reactant gas channel from an upstream end thereof to a downstream end thereof, the second reactant gas channel is a reactant gas channel which overlaps the peripheral portion of the electrode and has a length of a portion overlapping the peripheral portion being longer than the predetermined length, when viewed from the thickness direction of the separator and tracing the reactant gas channel from an upstream end thereof to a downstream end thereof, a reactant gas flowing through the second reactant gas channel is the same kind of reactant gas as a reactant gas flowing through the first reactant gas channel, and a flow rate of the reactant gas flowing through the second reactant gas channel is lower than a flow rate of the reactant gas flowing through the first reactant gas channel.

2. The polymer electrolyte fuel cell according to claim 1, wherein the second reactant gas channel is formed such that a fluid resistance of the reactant gas flowing therethrough is higher than that of the reactant gas flowing through the first reactant gas channel.

3. The polymer electrolyte fuel cell according to claim 1, wherein the second reactant gas channel is formed such that a cross-sectional area thereof is smaller than that of the first reactant gas channel.

4. The polymer electrolyte fuel cell according to claim 1, wherein the second reactant gas channel is formed such that a length thereof is longer than that of the first reactant gas channel.

5. The polymer electrolyte fuel cell according to claim 1, wherein the plurality of reactant gas channels are formed so as to extend in parallel with one another.

6. The polymer electrolyte fuel cell according to claim 1, further comprising a reinforcing member, wherein
the reinforcing member is provided at a peripheral portion of the polymer electrolyte membrane when viewed from the thickness direction of the separator.

7. The polymer electrolyte fuel cell according to claim 6, wherein the reinforcing member is provided such that a part thereof contacts the other main surface of the catalyst layer and overlaps the catalyst layer when viewed from the thickness direction of the separator.

8. The polymer electrolyte fuel cell according to claim 6, wherein the reinforcing member is provided so as not to overlap the catalyst layer when viewed from the thickness direction of the separator.

9. The polymer electrolyte fuel cell according to claim 6, wherein the reinforcing member is made of resin.

10. The polymer electrolyte fuel cell according to claim 1, wherein the plurality of reactant gas channels are formed on one main surface of the separator.

11. The polymer electrolyte fuel cell according to claim 1, wherein the plurality of reactant gas channels are formed on one main surface of the gas diffusion layer.

12. The polymer electrolyte fuel cell according to claim 1, wherein the plurality of reactant gas channels are formed on each of one main surface of the separator and one main surface of the gas diffusion layer.

13. The polymer electrolyte fuel cell according to claim 1, wherein the second reactant gas channel entirely overlaps the peripheral portion of the electrode.

14. The polymer electrolyte fuel cell according to claim 1, wherein the peripheral portion of the electrode is a region between an outer end of the electrode and a portion located inwardly away from the outer end of the electrode by a predetermined distance.

15. The polymer electrolyte fuel cell according to claim 1, wherein:
the electrode has a rectangular shape having four sides, and
the peripheral portion of the electrode is a region enclosed by the four sides and lines located inwardly away from the four sides by a predetermined distance.

16. The polymer electrolyte fuel cell according to claim 1, wherein:
the electrode has a rectangular shape having a first side and a second side opposite to the first side, and
a plurality of second reactant gas channels are arranged along each of the first side and the second side.

17. The polymer electrolyte fuel cell according to claim 1, wherein an area of the peripheral portion is equal to or smaller than one-fifth of an area of the electrode.

18. The polymer electrolyte fuel cell according to claim 1, wherein an area of the peripheral portion is equal to or smaller than one-tenth of an area of the electrode.

19. The polymer electrolyte fuel cell according to claim 1, wherein each of a left end and a right end of the plurality of reactant gas channels is the second reactant gas channel.

* * * * *